(12) United States Patent
Bookbinder et al.

(10) Patent No.: US 10,578,811 B2
(45) Date of Patent: Mar. 3, 2020

(54) METHODS OF FORMING FERRULES FOR OPTICAL FIBER CONNECTORS, AND OPTICAL FIBER CABLE ASSEMBLIES RELATED TO SUCH METHODS

(71) Applicant: Corning Optical Communications LLC, Hickory, NC (US)

(72) Inventors: Dana Craig Bookbinder, Corning, NY (US); Garrett Andrew Piech, Corning, NY (US); James Scott Sutherland, Corning, NY (US); Michael Brian Webb, Lindley, NY (US); Elvis Alberto Zambrano, Wilmington, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/191,548

(22) Filed: Nov. 15, 2018

(65) Prior Publication Data
US 2019/0162915 A1    May 30, 2019

Related U.S. Application Data

(60) Provisional application No. 62/592,049, filed on Nov. 29, 2017.

(51) Int. Cl.
*G02B 6/36* (2006.01)
*G02B 6/38* (2006.01)

(52) U.S. Cl.
CPC ......... *G02B 6/3873* (2013.01); *G02B 6/3839* (2013.01); *G02B 6/3861* (2013.01); *G02B 6/3865* (2013.01); *G02B 6/3825* (2013.01); *G02B 6/3843* (2013.01); *G02B 6/3877* (2013.01)

(58) Field of Classification Search
CPC ... G02B 6/3873; G02B 6/3865; G02B 6/3839
See application file for complete search history.

(56) References Cited

U.S. PATENT DOCUMENTS

| 4,146,300 A | 3/1979 | Kaiser |
| 4,205,896 A | 6/1980 | Borsuk |
| 4,721,357 A | 1/1988 | Kovalchick et al. |
| 4,763,980 A | 8/1988 | Gerber et al. |
| 4,880,291 A * | 11/1989 | Aberson, Jr. ........ G02B 6/3821 385/55 |
| 5,216,734 A | 6/1993 | Grinderslev |

(Continued)

FOREIGN PATENT DOCUMENTS

| CN | 201979258 U | 9/2011 |
| CN | 102699781 A | 10/2012 |

(Continued)

*Primary Examiner* — Ellen E Kim
(74) *Attorney, Agent, or Firm* — Kapil U. Banakar

(57) ABSTRACT

Methods of forming a ferrule are disclosed where the ferrule includes an inner member and an outer member. An optical fiber is secured in an axial bore of the inner member, and then offset of a core of the optical fiber from a geometric center of the inner member is determined. The outer member is then formed over the inner member to "correct" for this offset so that the core of the optical fiber ends up closer to the geometric center of the resulting ferrule. Related ferrules and cable assemblies including the same are also disclosed.

20 Claims, 15 Drawing Sheets

(56) References Cited

U.S. PATENT DOCUMENTS

| | | | |
|---|---|---|---|
| 5,278,928 A | 1/1994 | Ueda et al. | |
| RE37,079 E | 3/2001 | Stephenson et al. | |
| 6,470,120 B2 * | 10/2002 | Green | G02B 6/3843 359/813 |
| 6,629,782 B2 | 10/2003 | McPhee et al. | |
| 6,655,851 B1 | 12/2003 | Lee | |
| 6,663,293 B2 | 12/2003 | Lampert et al. | |
| 6,715,932 B2 | 4/2004 | Kuroha et al. | |
| 6,742,936 B1 | 6/2004 | Knecht et al. | |
| 6,935,791 B2 * | 8/2005 | Ban | G02B 6/4214 385/52 |
| 7,209,375 B2 | 4/2007 | Gimbel et al. | |
| 7,322,751 B2 * | 1/2008 | Hurt | G02B 6/4226 385/55 |
| 7,480,432 B2 | 1/2009 | Grzybowski et al. | |
| 7,724,992 B2 | 5/2010 | Sutherland | |
| 7,792,404 B2 | 9/2010 | Streltsov et al. | |
| 8,291,729 B2 | 10/2012 | Grzybowski et al. | |
| 8,397,537 B2 | 3/2013 | Grzybowski et al. | |
| 8,702,322 B1 | 4/2014 | Danley et al. | |
| 9,128,254 B2 | 9/2015 | Danley et al. | |
| 9,588,303 B2 | 3/2017 | Danley et al. | |
| 9,612,177 B2 | 4/2017 | Clarke et al. | |
| 2002/0172469 A1 | 11/2002 | Benner et al. | |
| 2003/0070257 A1 | 4/2003 | Takahashi et al. | |
| 2003/0095753 A1 | 5/2003 | Wada et al. | |
| 2003/0235373 A1 | 12/2003 | Ishii et al. | |
| 2010/0272397 A1 * | 10/2010 | Komaki | G02B 6/3869 385/72 |
| 2010/0301502 A1 * | 12/2010 | Ott | B29D 11/0075 264/1.25 |
| 2015/0177097 A1 | 6/2015 | Clarke et al. | |
| 2015/0338574 A1 | 11/2015 | Pelletier | |
| 2016/0033325 A1 | 2/2016 | Fusco et al. | |
| 2016/0061690 A1 | 3/2016 | Elkins, II et al. | |
| 2016/0131850 A1 | 5/2016 | Kondo et al. | |

FOREIGN PATENT DOCUMENTS

| | | |
|---|---|---|
| CN | 202742191 U | 2/2013 |
| JP | 10221568 A | 8/1998 |
| JP | 2002146583 A | 5/2002 |
| JP | 2002212772 A | 7/2002 |
| JP | 2003175444 A | 6/2003 |
| JP | 2003248137 A | 9/2003 |
| JP | 2005283300 A | 10/2005 |

* cited by examiner

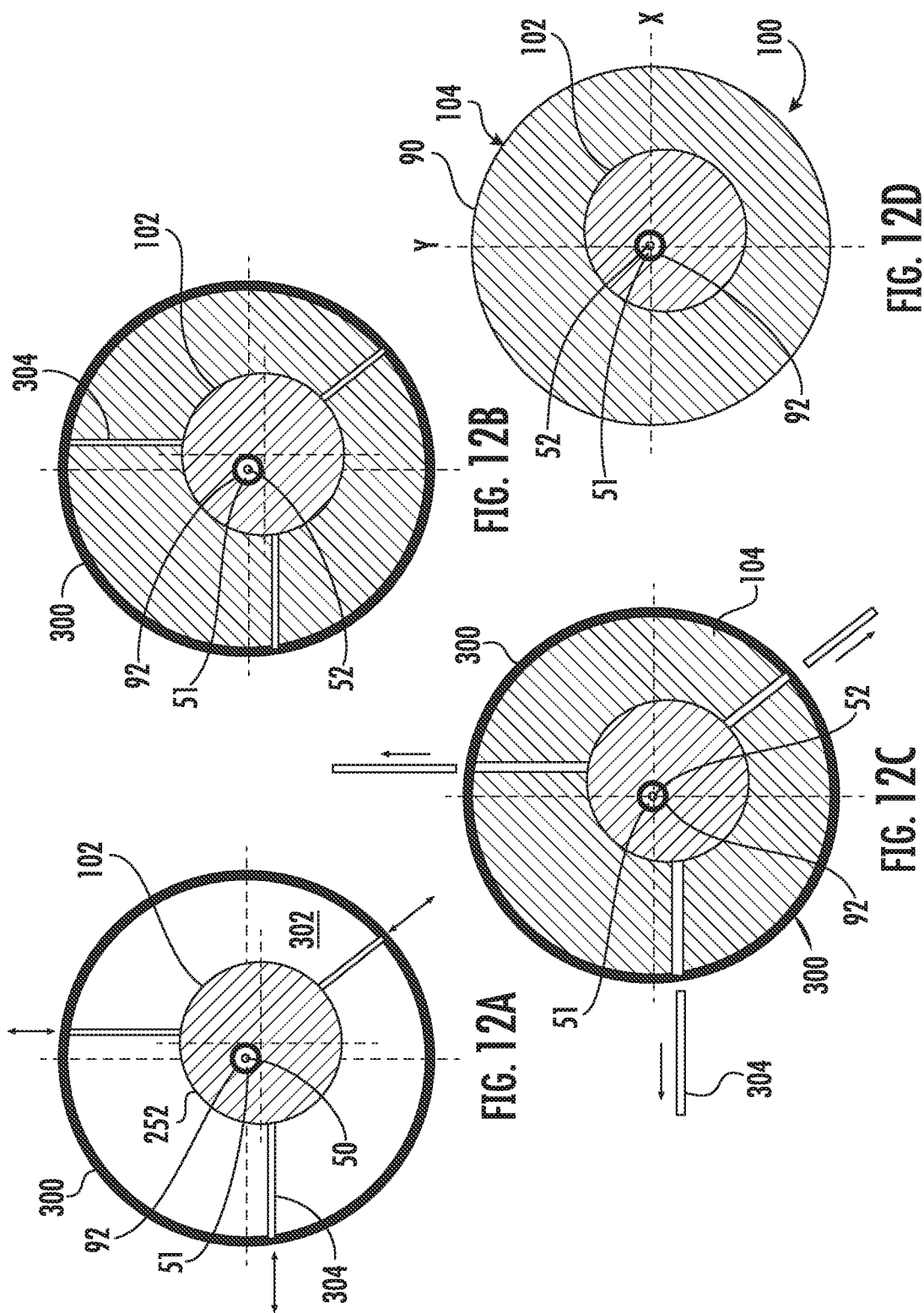

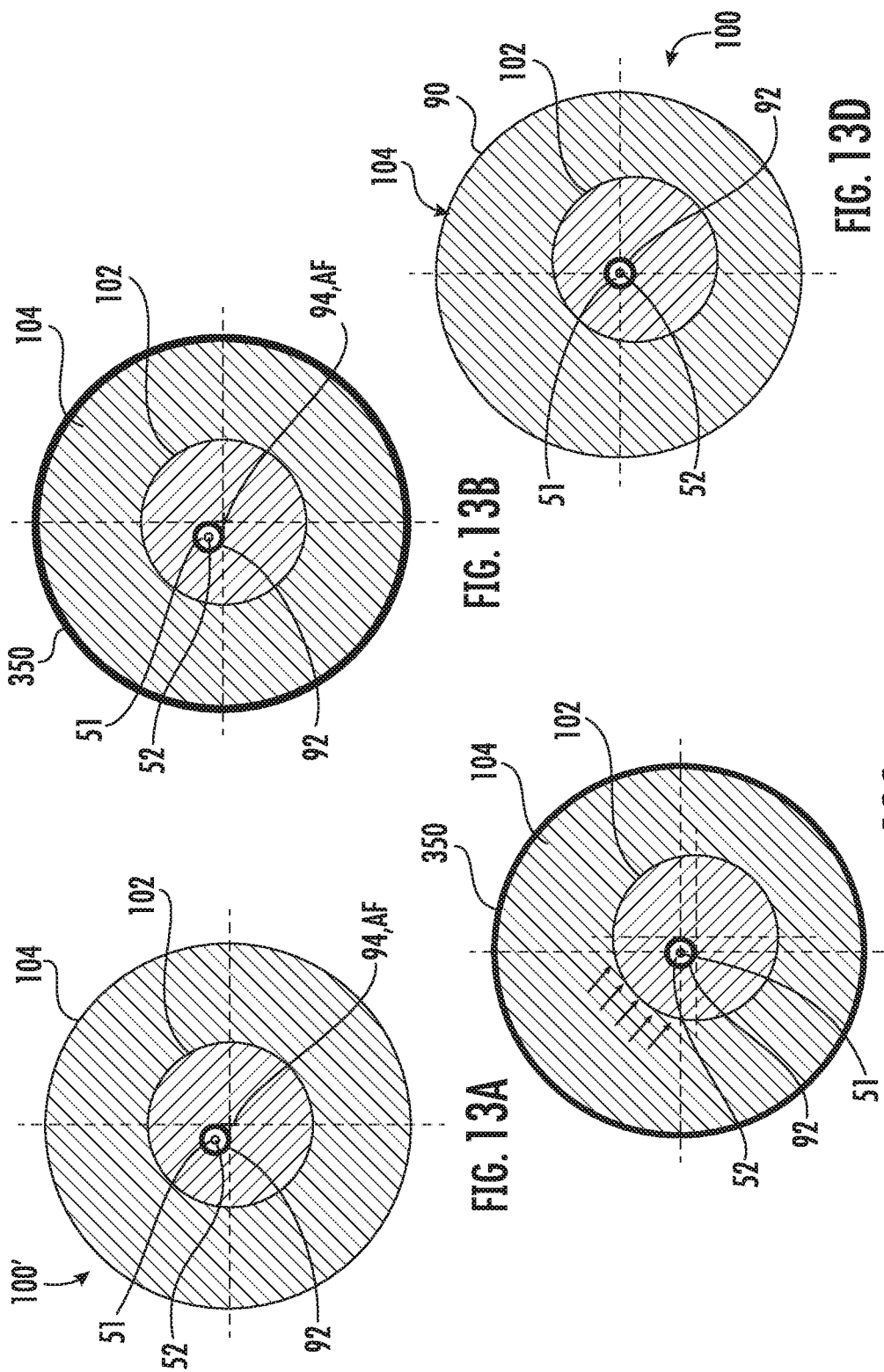

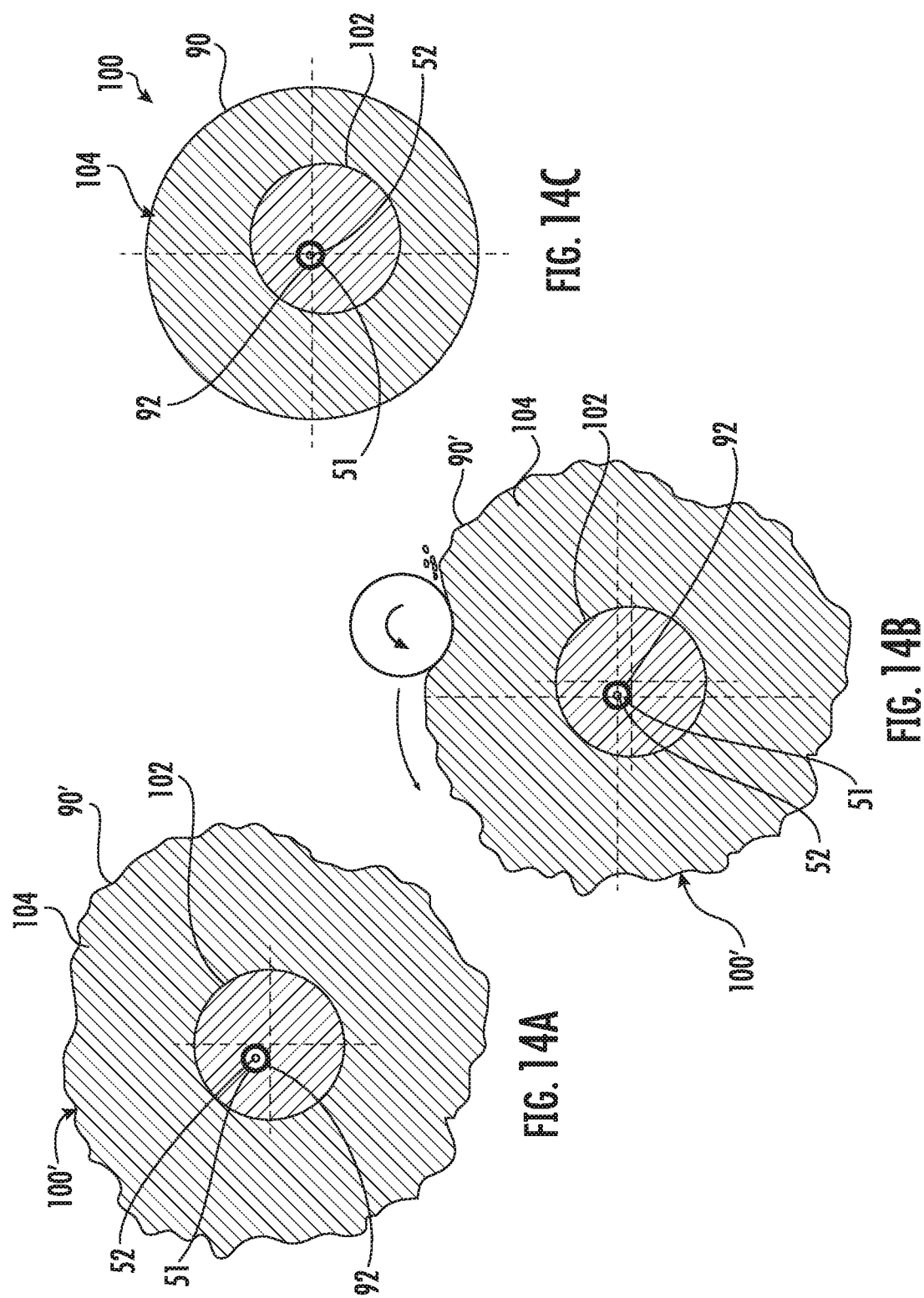

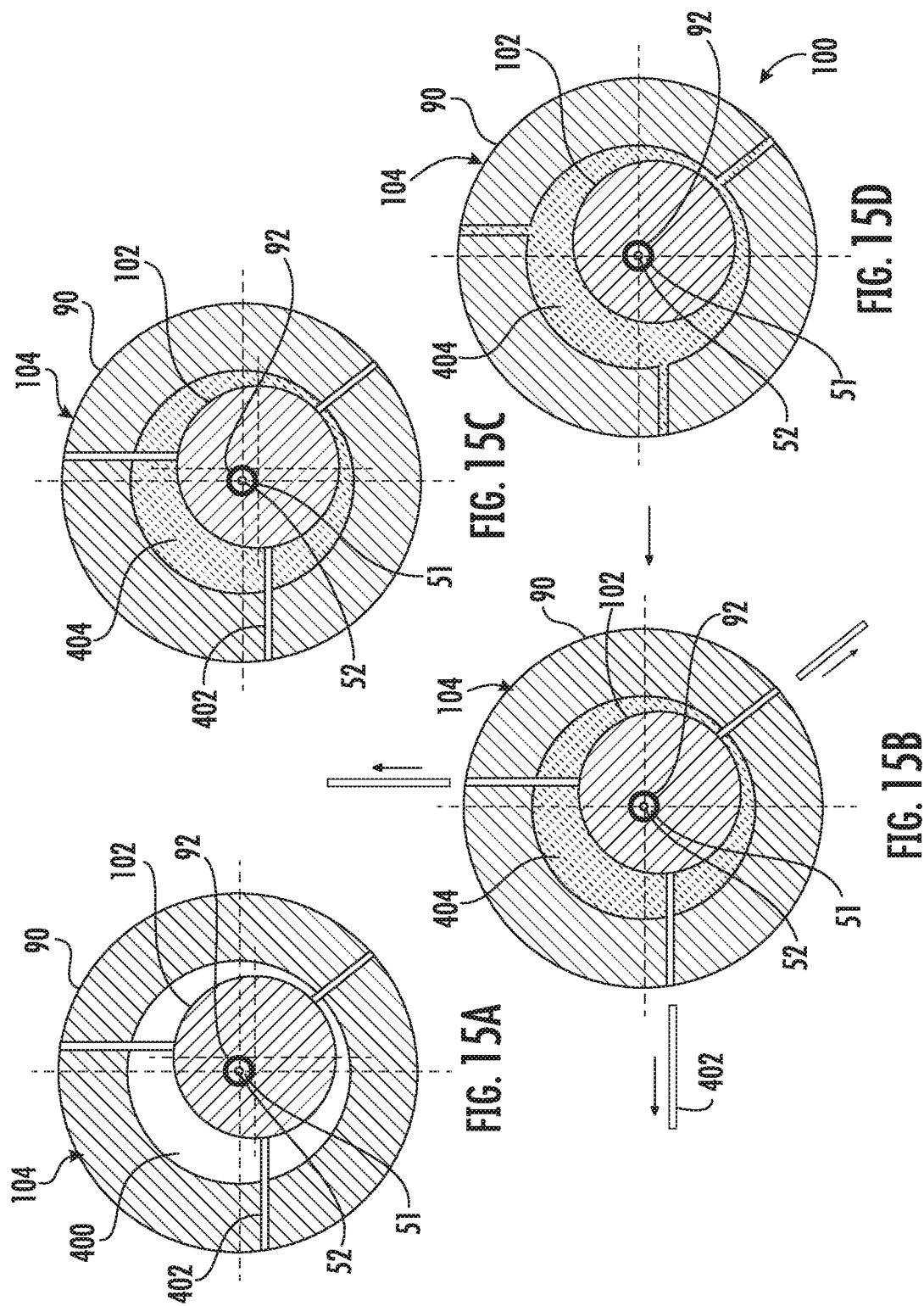

METHODS OF FORMING FERRULES FOR OPTICAL FIBER CONNECTORS, AND OPTICAL FIBER CABLE ASSEMBLIES RELATED TO SUCH METHODS

CROSS-REFERENCE TO RELATED APPLICATIONS

This application claims the benefit of priority of U.S. Provisional Application No. 62/592,049, filed on Nov. 29, 2017, the content of which is relied upon and incorporated herein by reference in its entirety.

FIELD

The present disclosure relates to optical fiber cable assemblies, and in particular to methods of forming ferrules for optical fiber connectors and optical cable assemblies.

BACKGROUND

Optical fiber connectors ("connectors") are devices used to optically connect one optical fiber to another, or to connect an optical fiber to another device such as an optical transmitter or an optical receiver. An optical fiber cable typically carries the optical fiber, which has a core section with a relatively high index of refraction and in which most of the light is carried, and a cladding section with a relatively low index of refraction that surrounds the core. A ferrule in the connector supports a bare end section of the optical fiber. The bare end section has a polished end face that coincides with a front face of the ferrule. The connector and the optical fiber cable constitute a cable assembly.

An important property of a connector is its ability to provide an efficient optical connection with the optical fiber of another connector, i.e., an optical connection whereby the optical loss (also called "insertion loss") from the light passing out of one fiber end face and into the other fiber end face is minimal. This efficiency is sometimes referred to as "coupling efficiency." A misalignment of the end faces of the two optical fibers supported by the two connectors is one of the main sources of insertion loss. Since most of the light traveling in an optical fiber is confined to the core, the coupling efficiency between two connectors depends in large measure on the amount of offset between the cores. This offset can be due to an offset between the location of the core of the optical fiber and the true center of the ferrule (i.e., the geometric center based on an outer surface of the ferrule), also known as core-to-ferrule eccentricity (CTFE). Thus, CTFE represents the concentricity error between the core and the ferrule ("core-to-ferrule" concentricity error).

Ideally, the cores of the optical fibers supported by respective connectors are perfectly axially aligned to maximize the coupling efficiency. In practice, however, there is almost always some amount of core-to-ferrule concentricity error. It would therefore be advantageous to reduce the core-to-ferrule concentricity error on a ferrule-by-ferrule basis to improve the coupling efficiency of connectors.

SUMMARY

An embodiment of the disclosure includes a method of forming a ferrule that includes an inner member with an axial bore for supporting an optical fiber. The method comprises: securing the optical fiber in the axial bore of the inner member, wherein the optical fiber comprises a core and a cladding; measuring a distance $\delta_1$ from a geometric center of the inner member to the core of the optical fiber, wherein the geometric center of the inner member is based on a profile of a first outer surface of the inner member; and forming an outer member over the inner member. The outer member includes a second outer surface that defines an exterior of the ferrule. The ferrule includes a ferrule geometric center based on a profile of the second outer surface of the outer member. The outer member is formed so that the core of the optical fiber is located a distance $\delta_2$ from the ferrule geometric center, wherein the distance $\delta_2$ is less than the distance $\delta_1$. To this end, the "concentricity error" of the core relative to the ferrule is improved, or lowered, compared to the concentricity error of the core relative to the inner member. The improvement or "correction" occurs during the formation of the outer member over the inner member.

Another embodiment of the disclosure includes optical fiber cable assembly that includes: an optical fiber cable having an optical fiber with a core surrounded by a cladding; and an optical fiber connector installed on the optical fiber cable. The optical fiber connector includes a ferrule comprising an inner member with an axial bore that supports the optical fiber, and with the inner member having a first outer surface. The ferrule also comprises an outer member positioned over the inner member, with the outer member having a second outer surface that defines an exterior of the ferrule. The inner member includes an inner member geometric center based on a profile of the first outer surface and a first central axis extending through the inner member geometric center. The core of the optical fiber is located a distance $\delta_1$ from the inner member geometric center. The ferrule includes a ferrule geometric center based on a profile of the second outer surface and a ferrule central axis extending through the ferrule geometric center. The core of the optical fiber is located a distance $\delta_2$ from the ferrule geometric center. The distance $\delta_1$ is greater than the distance $\delta_2$.

Additional features and advantages are set out in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 12A-12D are schematic front-end views showing a second example method of how an outer member may be formed over to the inner member of FIG. 10 to result in a ferrule that has a geometric center closely aligned with the core of the optical fiber, with the method involving molding the outer member onto the inner member;

FIGS. 13A-13D are schematic front-end views showing a third example method of how an outer member may be formed over the inner member of FIG. 10 to result in a ferrule that has a geometric center closely aligned with the core of the optical fiber, with the method involving heating polymer material of the outer member into a flowable state;

FIGS. 14A-14C are schematic front-end views showing a fourth example method of how an outer member may be formed over the inner member of FIG. 10 to result in a ferrule that has a geometric center closely aligned with the core of the optical fiber, with the method involving removing material from an outer surface of an initially-formed assembly;

FIGS. 15A-15D are schematic front-end views showing a fifth example method of how an outer member may be formed over the inner member of FIG. 10 to result in a ferrule that has a geometric center closely aligned with the core of the optical fiber, with the method involving a pre-constructed outer member that is positioned over and secured relative to the inner member.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

In the discussion below, the term "cylindrical" is not limited to body having a strictly circular cross-sectional shape and can include other cross-sectional shapes.

Also in the discussion below, the term "core-to-ferrule concentricity" can also be referred to as the "coaxiality," and the core-to-ferrule concentricity error can be referred to as a "coaxial error" or the "coaxiality error."

Optical Fiber Connector

Figure 1:
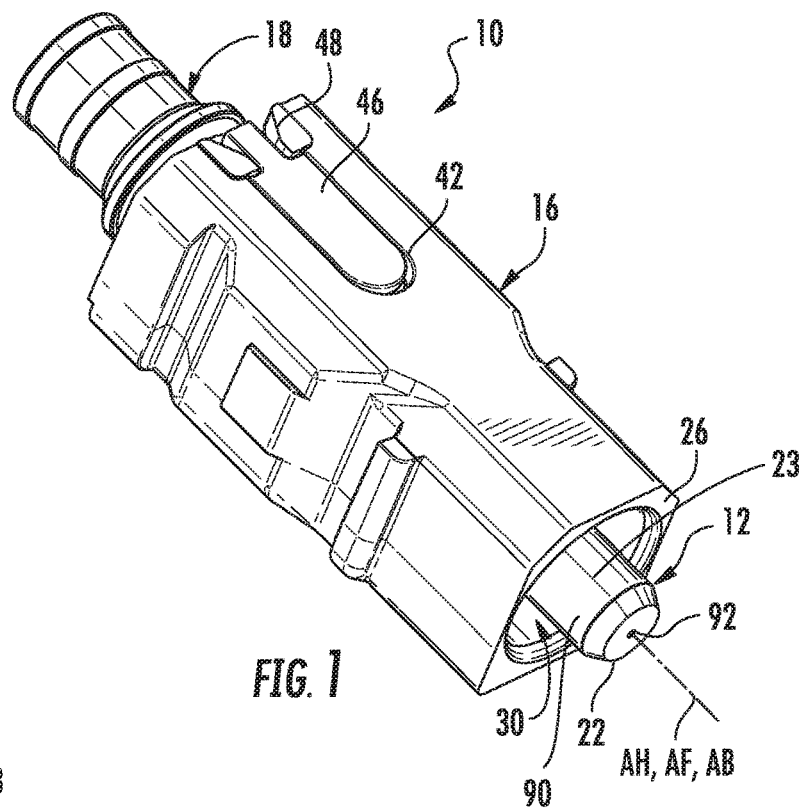
FIG. 1 is a perspective view of an example optical fiber connector.
Figure 2:
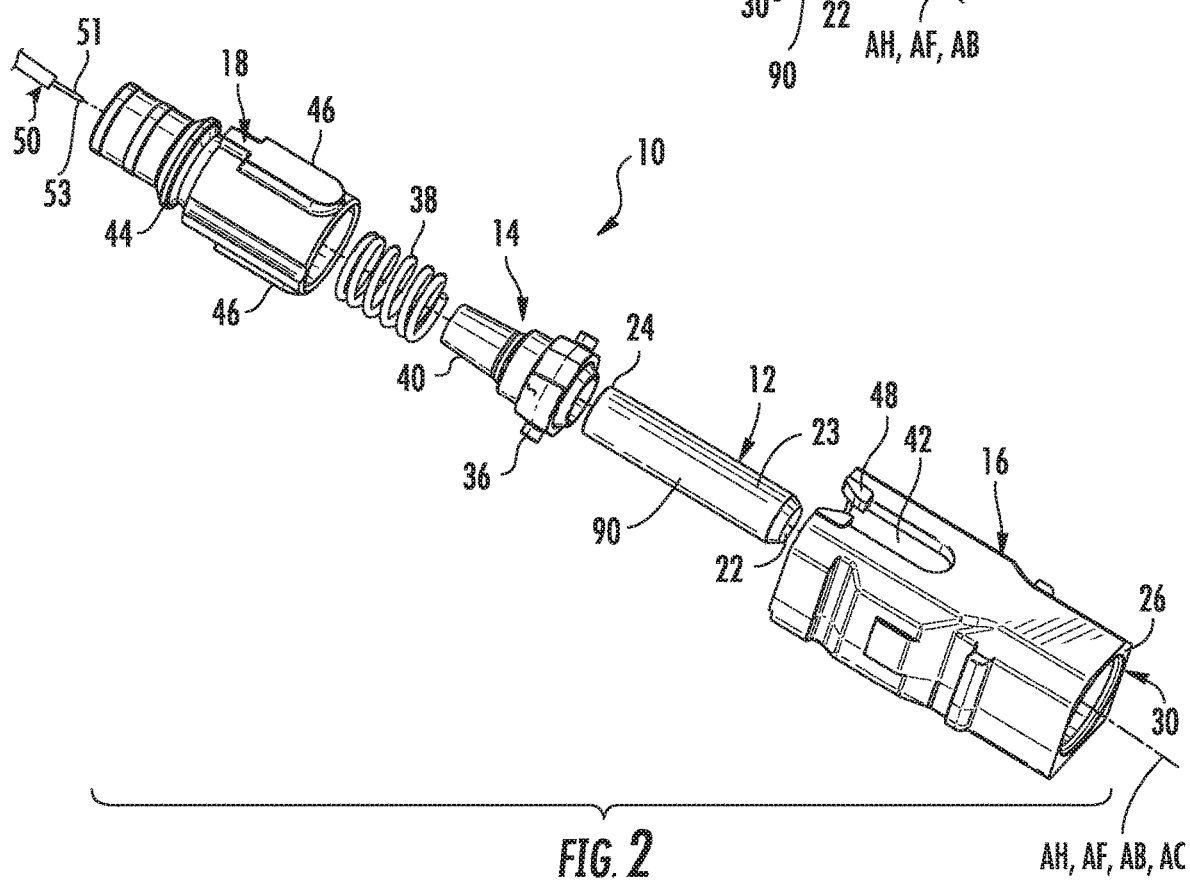
FIG. 2 is an exploded perspective view of the optical fiber connector of FIG. 1.

FIGS. 1 and 2 are perspective and exploded views an example of an optical fiber connector 10 ("connector 10"). The connector 10 includes a ferrule 12 having a front end 22 and a back end 24, a ferrule holder 14 from which the ferrule 12 extends, and a housing 16 having a cavity 30 in which the ferrule holder 14 is received, and a rear connector body 18. The ferrule 12 is configured to support a bare fiber section 51 of an optical fiber 50, as discussed in greater detail below. The housing 16 includes a front end 26 and may be referred to as an "inner housing" because, even though the housing 16 defines datum/reference features intermatability with an adapter (not shown in FIGS. 1 and 2), in some embodiments the housing 16 may be covered by an outer shroud 32 (FIG. 4) that facilitates insertion into and removal from the adapter.

Still referring to FIGS. 1 and 2, the connector body 18 (also referred to as "retention body 18", or "crimp body 18") is configured to retain the ferrule holder 14 within the cavity 30 of the housing 16. More specifically, the back end 24 of ferrule 12 is received in a front-end portion 36 of ferrule holder 14 and secured therein in a known manner (e.g., press-fit, adhesive, molding the ferrule holder 14 over the back end 24 of the ferrule 12, etc.). The ferrule 12 and ferrule holder 14 may even be a monolithic structure in some embodiments. For convenience, the term "ferrule assembly" may be used to refer to the combination of the ferrule 12 and ferrule holder 12, regardless of whether these elements are separate components secured together or different portions of a monolithic structure.

The ferrule holder 14 is biased to a forward position within the housing 16 by a spring 38, which extends over a back-end portion 40 of ferrule holder 14. The back-end portion 40 has a reduced cross-sectional diameter/width compared to the front-end portion 36. The spring 40 also interacts with internal geometry of the connector body 18, which may be secured to the housing 16 using a snap-fit or the like. For example, FIGS. 1 and 2 illustrate a rear portion of the housing 16 having cut-outs or slots 42 on opposite sides so as to define a split shroud. The connector body 18 is generally tubular in shape with a medial shoulder 44 arranged between different diameter portions. The connector body 18 further includes protrusions 46 (which may embody tabs) configured to be snapped into the slots 42 of the housing 16 and retained therein due to the geometries of the components and the presence of locking tabs 48 proximate to a leading edge of each slot 36 of the housing 16.

When the connector 10 is assembled as shown in FIG. 1, a front-end section 23 of the ferrule 20 projects beyond the front end 26 of the housing 16. The front-end section 23 presents an end face of the bare fiber section 51 for optical coupling with a mating component (e.g., another fiber optic connector; not shown). The ferrule 12 is generally intended to align the bare fiber section 51 along a longitudinal axis AH of the housing 16.

Figure 3:
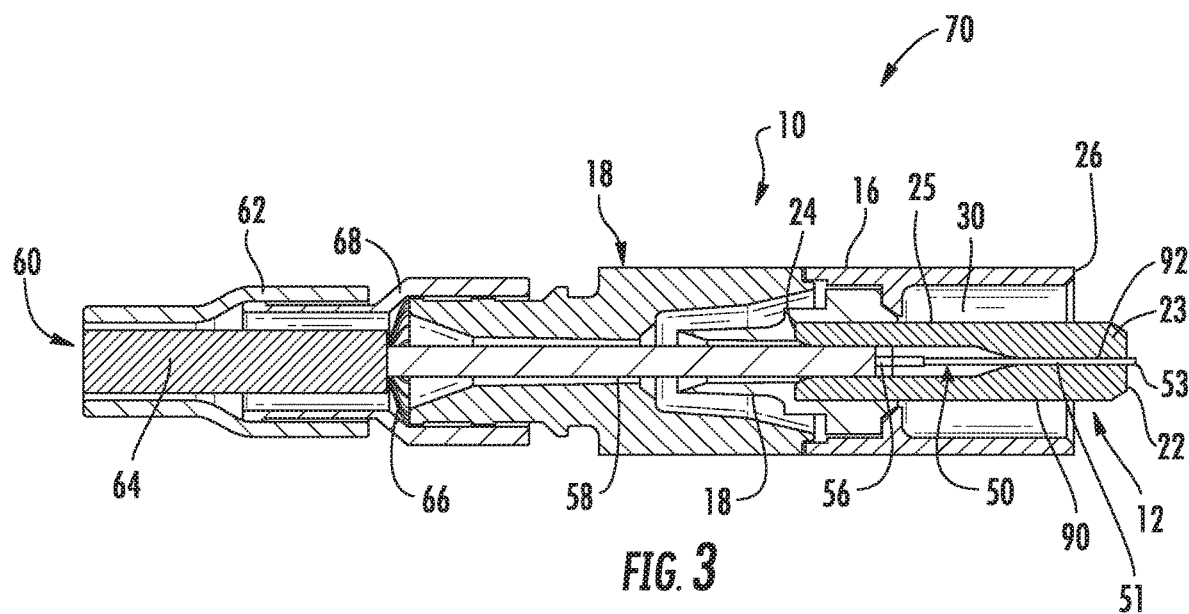
FIG. 3 is a cross-sectional view of the optical fiber connector of FIGS. 1 and 2 installed on a fiber optic cable to form an optical fiber cable assembly.

FIG. 3 is a cross-sectional view of the connector 10 of FIGS. 1 and 2, shown along with a fiber optic cable 60 ("cable 60") that supports the optical fiber 50. FIG. 3 illustrates an example of how the cable 60 can be "terminated" with the connector 10 (i.e., have the connector 10 installed thereon) to form a cable sub-assembly 70. The particular cable 60 shown is merely to facilitate discussion, and other types of cables 60 can be used. In the embodiment shown, the cable 60 includes an outer jacket 62, an inner jacket 64, and strength members 66 in the form of aramid yarn. The optical fiber 50 in the embodiment shown includes a coating 56 and a buffer layer 58 ("tight buffer 58").

Portions of the outer jacket 62 and inner jacket 64 have been removed from the cable 60 to expose the strength members 66, which are cut to a desired length and placed over a rear portion of the connector body 18. The strength members 66 are coupled to the connector body 18 by a crimp band 68 (also referred to as a "crimp ring") that has been positioned over a portion of the strength members 66 and the inner jacket 64. Again, the cable 60 is merely an example, as persons skilled in optical connectivity will appreciate how different cable and connector designs may be used in connection with the methods discussed below.

Figure 4:
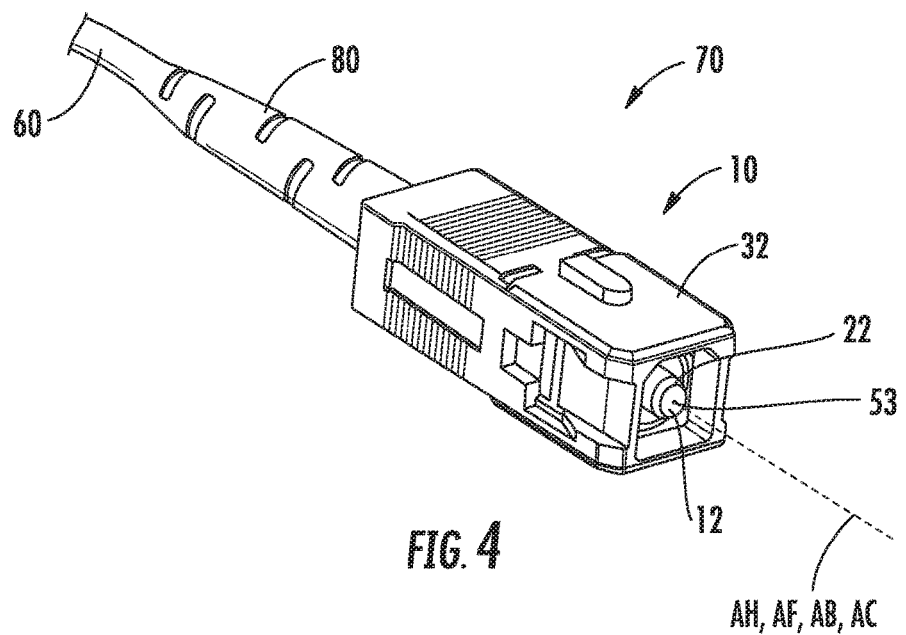
FIG. 4 is a perspective view of the cable assembly of FIG. 3 having an outer shroud received over the optical fiber connector and a boot received over the cable-connector interface.

FIG. 4 is a perspective view of the cable assembly 70 with an outer shroud 32 received over the housing 16. The outer shroud 32 may serve as a push-pull mechanism to assist with insertion into and removal from an adapter. A flexible boot 80 is employed to assist in mechanically connecting the cable 60 to the connector body 18.

The Ferrule

Figure 5A:
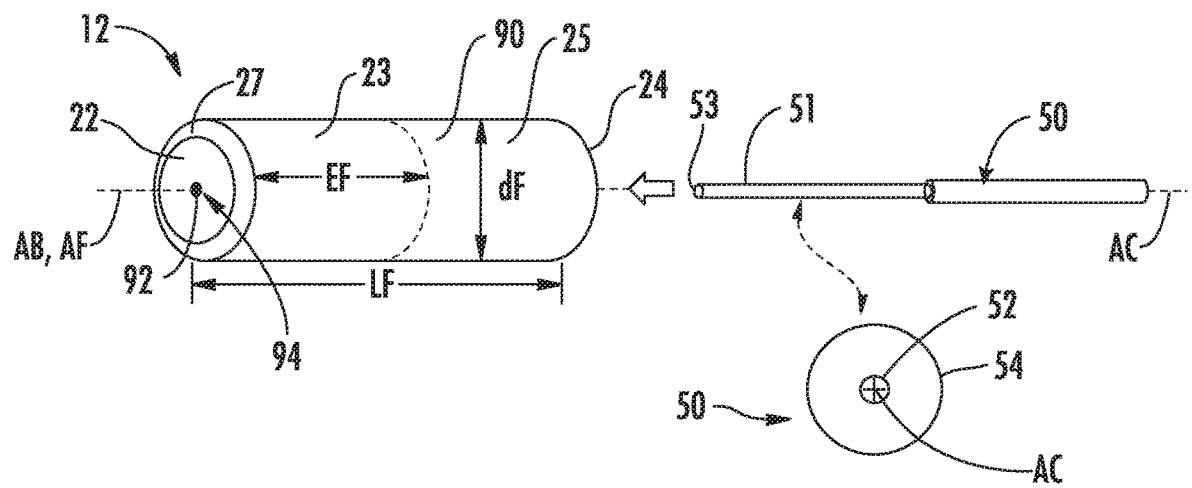
FIGS. 5A and 5B are schematic perspective and side views of an example ferrule.
Figure 5B:
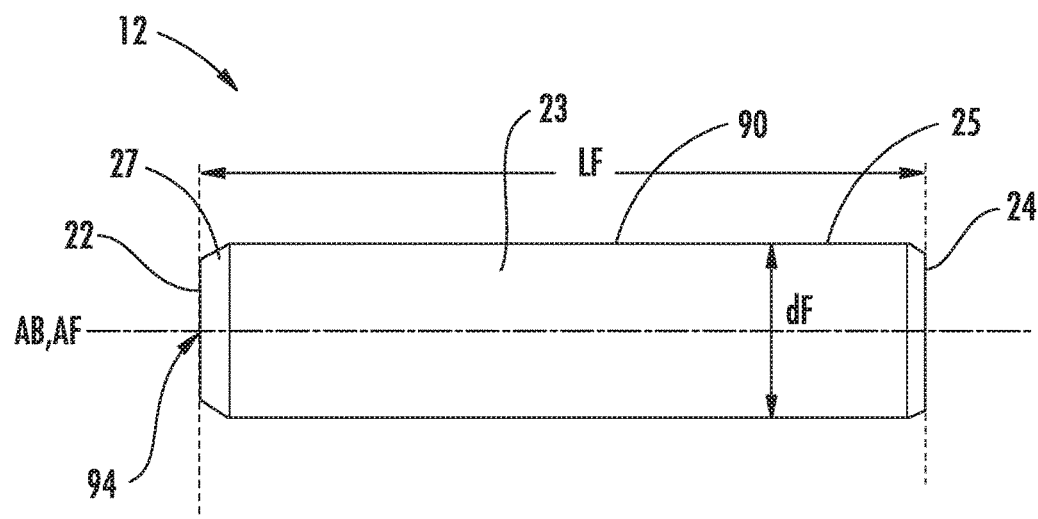

FIG. 5A is a perspective view of an example of the ferrule 12 and optical fiber 50, and FIG. 5B is a side view of the ferrule 12. The ferrule 12 is substantially cylindrical and in an example has a substantially circular cross-sectional shape. The ferrule 12 has the aforementioned front and back ends 22 and 24, as well as an outer surface 90, and an axial bore 92. The front-end section 23 of the ferrule 12 is adjacent (i.e., includes and extends from) the front end 22. The ferrule 12 also includes a back-end section 25 adjacent the back end 24.

The ferrule 12 has an axial length LF, which may be 10.5 mm for an SC-type connector and 7.5 mm for an LC-type connector. The ferrule 12 also has a nominal diameter dF, which in this disclosure generally refers to the stated value for the diameter of the ferrule 12 (i.e., a commonly-accepted value for an actual value of the diameter). For example, the nominal diameter dF may be 2.5 mm for ferrules intended for SC-type connectors and 1.25 mm for ferrules intended for LC-type connectors. Generally, the ferrule 12 is not limited to specific types of connectors and so can have any reasonable nominal diameter dF and any reasonable length LF that might be used to form an optical fiber connector. An exemplary material for the ferrule 12 is zirconia. Other materials for the ferrule 12 include glass, metal, polymers, ceramics, and like materials, including combinations of the aforementioned materials, etc.

In an example, the ferrule 12 includes a beveled section 27 at the front end 22 adjacent the outer surface 90. The beveled section 27 transitions from the diameter of the front end 22 to the nominal diameter dF (generally defined by the outer surface 90 in the embodiment shown). As also shown in FIG. 3, the axial bore 92 is sized to hold the bare fiber section 51 (an end of the optical fiber 50 stripped of coating layers). A front end face 53 of the bare fiber section 51 resides substantially at (within 1 μm, or even within 200 nm) the front end 22 of ferrule 12. The bare fiber section 51 includes a central core ("core") 52 surrounded by a cladding 54. The core 52 has a central axis AC.

The axial bore 92 has a central axis ("bore central axis") AB while the ferrule 12 has a central axis AF that runs through a "true center" 94 of the ferrule 12 that is based on the outer surface 90. The true center 94 represents the geometric center of the ferrule 12 based on the cross-sectional shape of the outer surface 90. In other words, the true center 94 corresponds to the geometric center of the cross-sectional shape of the ferrule 12 and may be referred in this disclosure as the "ferrule geometric center 94."

In some embodiments, the cross-sectional shape of the outer surface 90 may be perfectly circular, in which case the ferrule geometric center 94 is at the center of the circle, with the bore central axis AB running through the ferrule geometric center 94 and thus being coaxial with the central axis AF of the ferrule 12. FIG. 4 shows this ideal case where the central axis AH of inner housing 16, the central axis AB of axial bore 92, the central axis AF of ferrule 12, and the central axis AC of core 52 are all co-axial. In practice, there is typically some amount of lateral offset between these axes due to manufacturing errors. For example, in practice, the axial bore 92 may only be nominally centered on the ferrule geometric center 94, i.e., to within a manufacturing tolerance, e.g., 1.0 micron (μm), 0.5 μm, or 0.3 μm.

Figure 5C:
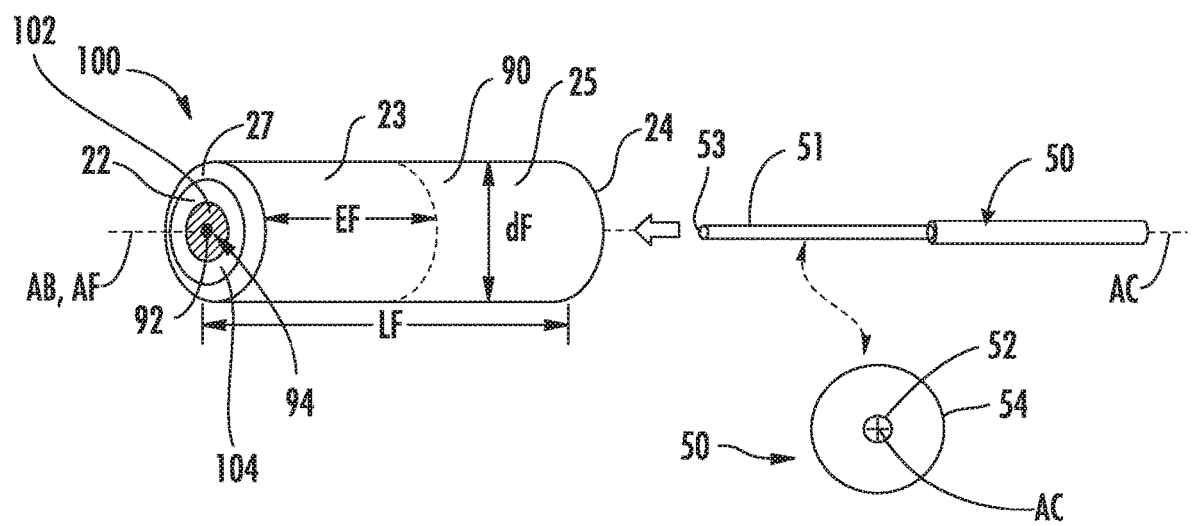
FIGS. 5C and 5D are schematic perspective and side views similar to FIGS. 5A and 5B, but illustrate an example of a two-piece ferrule having inner and outer members.
Figure 5D:
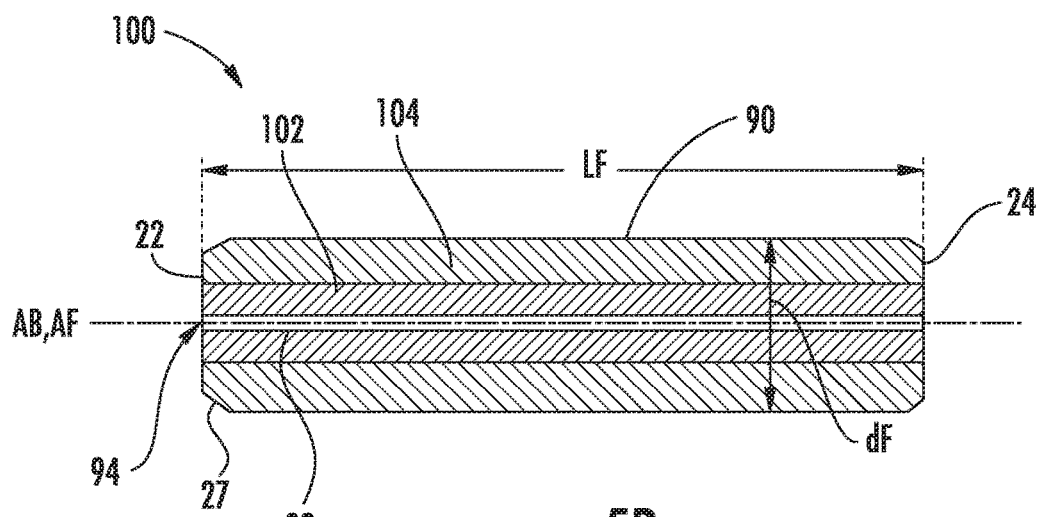

FIGS. 5C and 5D are similar to FIG. 5A and FIG. 5B, and illustrate an example ferrule 100 having a two-part construction wherein the ferrule 100 includes or consists of an inner member 102 (or "inner part 102") and an outer member 104 (or "outer part 104") that surrounds the inner member 102 and defines the outer surface 90. The inner member 102 includes the axial bore 92 and, in the embodiment shown, is generally cylindrical. The inner member 102 may be formed from a first material, and the outer member 104 (also generally cylindrical) may be formed from a second material that is different than the first material. For example, the first material may comprise a ceramic material, and the second material may comprise a polymer, metal, glass, or different ceramic material. Unless otherwise noted, any discussions herein relating to the ferrule 100 may apply to variations where there may be one or more intermediate layers or members between the inner member 102 and outer member 104.

Various techniques for determining ferrule geometric center 94 (e.g., of the ferrule 10, the ferrule 100, or other ferrules) will be appreciated by those skilled in optical connectivity. For example, the ferrule geometric center 94 may be determined by axially rotating a ferrule while measuring a distance between the outer surface 90 and a reference point. For a perfectly circular ferrule, a plot of this distance versus the angle of rotation traces a sinusoid if the rotation axis is not on the geometric. The ferrule geometric center 94 can be determined from the shape of the sinusoid. If the ferrule is not perfectly circular (perfectly circularly symmetric), then the plot of distance vs. rotation angle will show small deviations from a perfect sinusoid that are indicative of the magnitude of the asymmetry. Regardless, curve fitting techniques may be used to associate a curve with the distance values measured at different rotation angles so that the ferrule geometric center 94 can be determined from the shape of the curve. Detailed examples based on these and related principles are disclosed in in U.S. Patent Application Publication No. US2015/0177097 ("the '097 Publication), the disclosure of which is incorporated herein by reference in its entirety.

In some embodiments, the ferrule geometric center 94 may be based on only some of the measurements between the outer surface 90 and a reference point when rotating the ferrule. For example, the measurements taken for a 360 degree rotation of the ferrule may be analyzed to determine the "highest" locations on the outer surface 90. These are the points on the outer surface 90 most likely to influence how the ferrule fits within a sleeve of an adapter or the like. As few as three points (e.g., the three "highest" locations on the outer surface 90) may be used in some embodiments to determine the ferrule geometric center 94. To this end, the ferrule geometric center 94 may represent the geometric center of the selected points (three or more) used for such a "high fitting" approach.

Figure 6A:
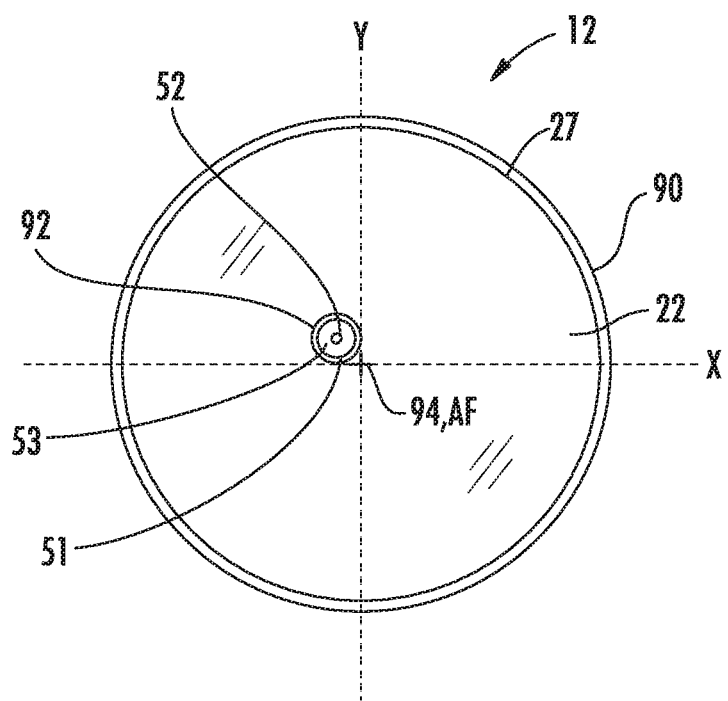
FIG. 6A is a front-end view of an embodiment of the ferrule of FIGS. 5A and 5B, showing a core of the optical fiber being radially offset from a geometric center of the ferrule (scale is exaggerated for clarity)

FIG. 6A is a front-end view of an example of the ferrule 12 showing the end face 53 of bare fiber section 51 within the axial bore 92. A Cartesian coordinate system in a plane perpendicular to the central axis AF of ferrule 12 may be defined with an x-axis and y-axis passing through the ferrule geometric center 94, as shown in the close-up view of FIG. 6B.

Figure 6B:
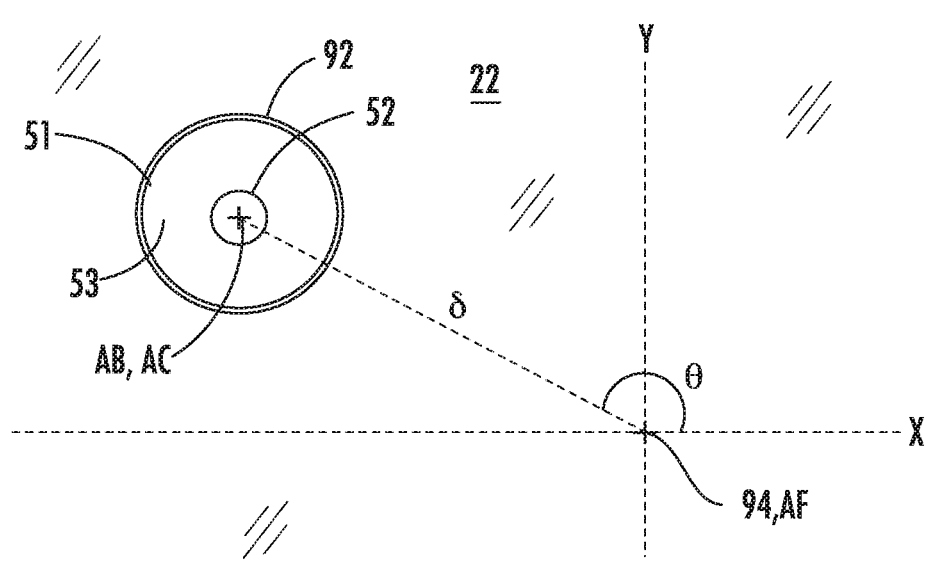
FIG. 6B is a close-up view of FIG. 6A, showing how concentricity error between the core of the optical fiber and the ferrule is represented in polar coordinates as a vector E=(δ, θ), where δ is the size (magnitude) of the offset and θ is the direction of the offset relative to a reference line, which is shown by way of example as an x-axis passing through the geometric center of the ferrule.

FIGS. 6A and 6B also illustrate an example core-to-ferrule concentricity error, which is exaggerated for ease of illustration. The close-up view of FIG. 6B shows the core 52 of bare fiber section 51 offset from the ferrule geometric center 94 by a distance (i.e., an amount or magnitude) $\delta$ in a direction (angle) $\theta$ measured relative to the +x axis in the plane perpendicular to the central axis AF. Thus, the core-to-ferrule concentricity error can be represented an error vector E=($\delta$, $\theta$) using polar coordinates, wherein the bold denotes vector status. Hereinafter, the core-to-ferrule concentricity error is simply referred to as the "concentricity error E". As noted above, this error is also referred to in the art as the "coaxial error" or "coaxiality error." Also note that the offset distance $\delta$ of the core 52 is generally measured with reference to central axis AC of the core 52 (i.e., the distance $\delta$ is measured from the ferrule geometric center 94 to the center of the core 52).

Figure 7A:
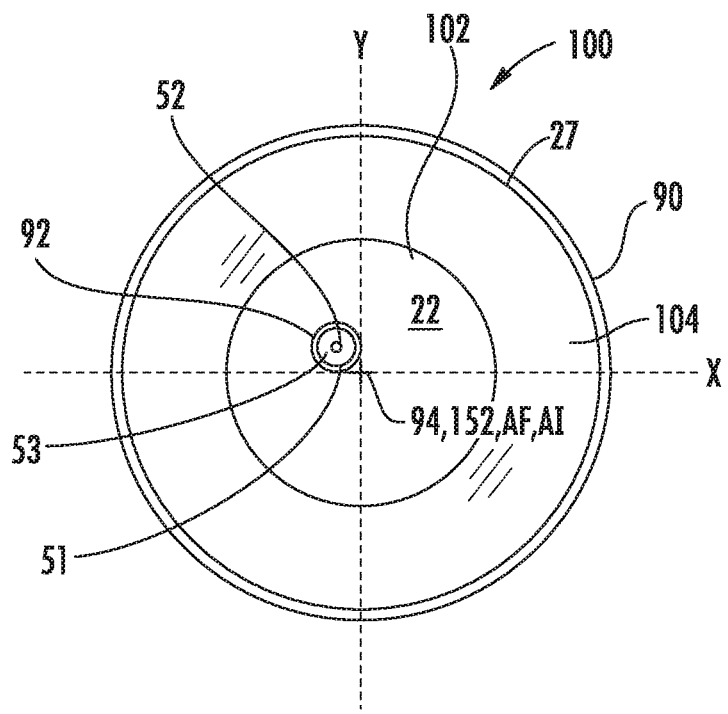
FIG. 7A is a front-end view of an embodiment of the ferrule of FIGS. 5C and 5D where the inner member has a geometric center aligned with a geometric center of the ferrule (as defined by the outer member), and shows a core of the optical fiber being radially offset from the geometric center of the ferrule (scale is exaggerated for clarity)
Figure 7B:
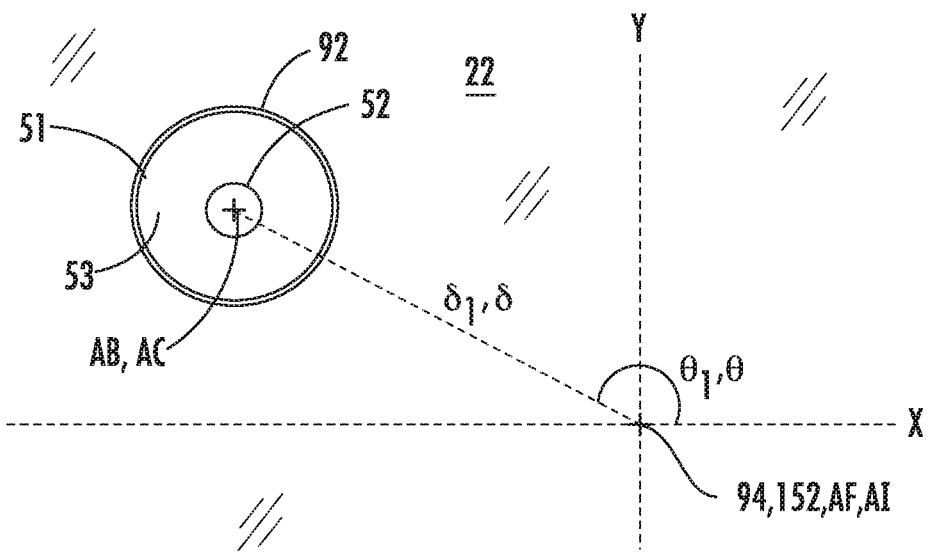
FIG. 7B is a close-up view of FIG. 7A, showing how concentricity error between the core of the optical fiber and the inner member is represented in polar coordinates as a vector $E_1=(\delta_1, \theta_1)$, where $\delta_1$ is the size (magnitude) of the offset and $\theta_1$ is the direction of the offset relative to a reference line, which is shown by way of example as an x-axis passing through the geometric center of the inner member.

FIGS. 7A and 7B are similar to FIGS. 6A and 6B, but illustrate an embodiment of the ferrule 100 of FIGS. 5C and 5D. It can be seen how the core 52 of the optical fiber 50 is still offset from the ferrule geometric center 94. In this embodiment, the inner member 102 is perfectly concentric with the outer member 104. That is, a geometric center 152 (or "inner member geometric center 152") and a central axis AI of the inner member 102 are aligned with the ferrule geometric center 94 and central axis AF. The core 52 is offset from the central axis AI of the inner member 102 by a distance $\delta_1$ and direction $\theta_1$, which are the same as the offset distance $\delta$ and direction $\theta$ due to the central axis AI being aligned with the central axis AF. As can be appreciated, the concentricity error E between the core 52 and the ferrule 150 is due to (and the same as) a concentricity error between the core 52 and the inner member 102, as represented by the error vector E1=($\delta_1$, $\theta_1$) using polar coordinates.

There are a number of source that can contribute to the concentricity error E. For a conventional ferrule like the ferrule 12, these sources include: 1) offset of core 52 relative to the cladding 54; 2) an offset of the bare fiber section 51 within the axial bore 92; and 3) an offset (non-centering) of the axial bore 92 relative to the ferrule geometric center 94. These error sources tend to be random so that the precise location of the core 52 relative to the outer surface 90 (and thus relative to the ferrule geometric center 94) in a given cable assembly 70 is typically not known unless it is measured.

Measurement of concentricity error E may be made using a non-contact measurement system, such as disclosed the aforementioned '097 Publication. It is noted that such non-contact measurements are made with increasing accuracy and precision if more of the outer surface 90 is exposed in front-end section 23 of the ferrule 12 because distance sensors can be used to measure the outer surface 90 at more axial locations than just a small exposed end portion of the outer surface 90.

Alternatively, the concentricity error E may be measured using a contact method that does not utilize a master connector or jumper (i.e., a reference connector or jumper) to establish an optical connection. An example of such a method is employed by the Koncentrik-V2 measurement system from Data-Pixel SAS of Chavanod, France, wherein a ferrule of a cable assembly is disposed on a precision ball array or sleeve. In other examples, the concentricity error E may be measured using contact methods that utilize a reference jumper.

Techniques for determining the ferrule geometric center 94 and concentricity error E can also be applied to determine the geometric center of the inner member 102 and concentricity error $E_1$ before completing construction of the ferrule 100. In essence, the inner member 102 may be considered a "mini ferrule" and be provided separately from the outer member 102. As will be described in greater detail below, the optical fiber 50 may be secured in the axial bore 92 of the inner member 102 before forming the outer member 104 over the inner member 102. This allows: i) both the geometric center 152 of the inner member 102 and the offset (i.e., the distance and direction) of the core 52 of the optical fiber 50 from the geometric center 152 to be determined, and ii) the outer member 104 to be formed in a manner to "correct" this offset. In other words, the concentricity error $E_1$ between the core 52 and the inner member 102 is taken into account when forming the outer member 104 over the inner member 102 to define the ferrule 100, so that the core 52 ends up being closer to the ferrule geometric center 94.

Figure 8A:
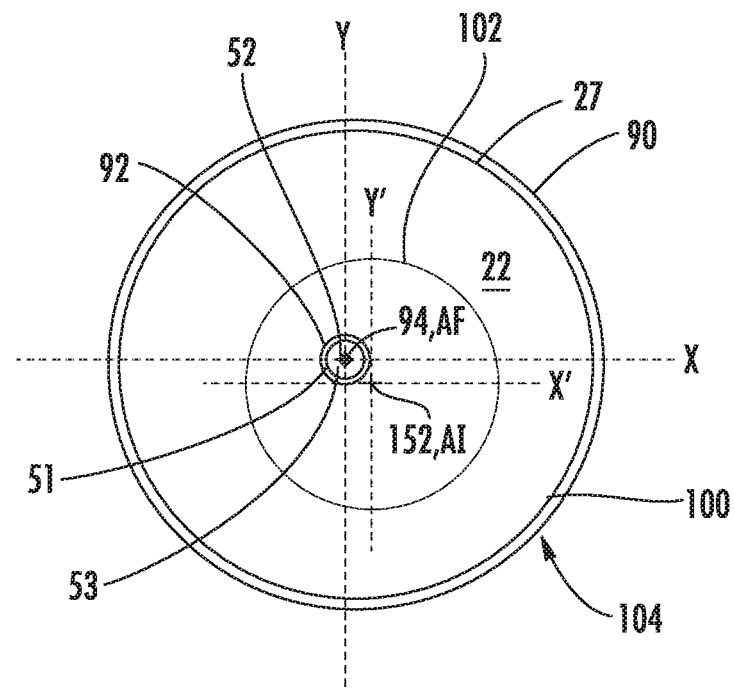
FIG. 8A and is similar to FIG. 7A, but shows an embodiment of the ferrule where the outer member is formed over the inner member so that the geometric center of the ferrule more closely coincides with the core of the optical fiber residing within the inner member.
Figure 8B:
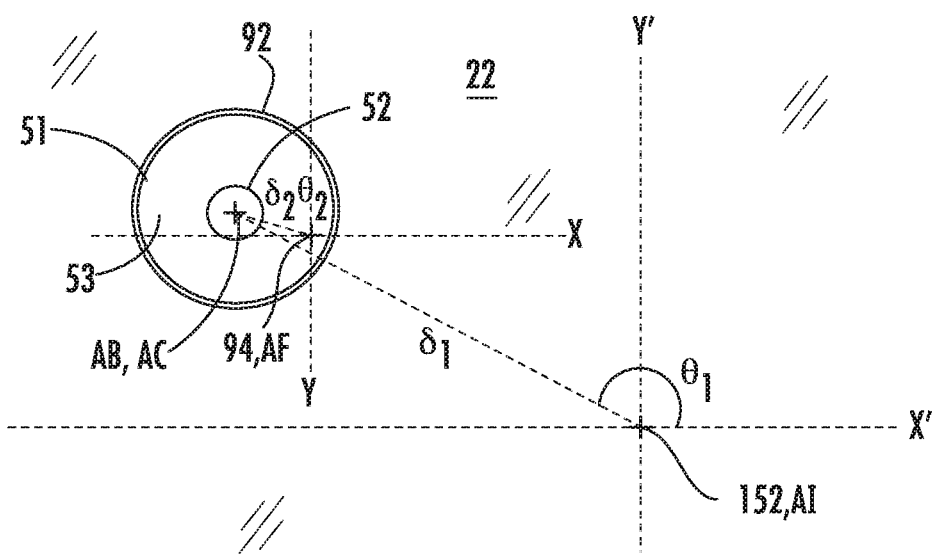
FIG. 8B is a close-up view of FIG. 8A, showing how concentricity error between the core of the optical fiber and the ferrule is now represented in polar coordinates as a vector $E_2=(\delta_2, \theta_2)$, where $\delta_2$ is the size (magnitude) of the offset and $\theta_2$ is the direction of the offset relative is less than to a reference line passing through the geometric center of the ferrule, and where where $\delta_2$ is less than $\delta_1$.

For example, FIGS. 8A and 8B illustrate an embodiment of the ferrule 100 where the outer member 104 has been formed so that the ferrule geometric center 94 and central axis AF are not aligned with the geometric center 152 and central axis AI of the inner member 102. The misalignment/offset is intentional. The ferrule 100 in FIGS. 8A and 8B has been strategically formed to result in the core 52 being in a more desirable position; one more closely aligned with the ferrule geometric center 94 and central axis AF. The result is a lower concentricity error E compared to, for example, the embodiment shown in FIGS. 7A and 7B.

The overall or final core-to-ferrule concentricity error of the ferrule 100 has been expressed above as E, as represented by the offset distance δ and direction θ. Now that the concentricity error $E_1$ of the inner member has been introduced, in embodiments where ferrules comprise the inner member 102 and outer member 104, the overall or final core-to-ferrule concentricity error will be expressed as $E_2$. The offset distance δ and direction θ will likewise be expressed as $δ_2$ and $θ_2$, respectively. Thus, $E_2=E$, $δ_2=δ$, and $θ_2=θ$. Using the additional subscript in the remainder of this Detailed Description section and in the Claims that follow helps avoid confusion with $E_1$, $δ_1$, and $θ_1$.

As shown in FIG. 8B, there may remain some offset between the core 52 of the optical fiber 50 and the ferrule geometric center 94 after the outer member 104 has been formed to define the final ferrule geometry. In particular, the core 52 is offset from the ferrule geometric center 94 by the offset distance $δ_2$ and in the direction $θ_2$. Advantageously, however, the offset distance $δ_2$ is much less than the offset distance $δ_1$. In some embodiments the offset distance $δ_2$ may be less than one-third, less than one-fourth, or even less than one-tenth the offset distance $δ_1$.

The magnitude of the concentricity error $|E_2|=δ_2$ can alternatively or additionally be expressed in terms of the nominal diameter dF of the ferrule 100. In some embodiments, the magnitude of the concentricity error $|E_2|=δ_2$ is less than 0.048% of the nominal diameter dF, or even less than 0.024% of the nominal diameter dF, or even smaller (e.g., less 0.012% of the nominal diameter dF). The distance $δ_2$ may be, for example, less than 1.2 µm, less than 0.6 µm, or even less than 0.3 µm for a ferrule having a nominal diameter dF of 1.25 mm or 2.5 mm.

Figure 9A:
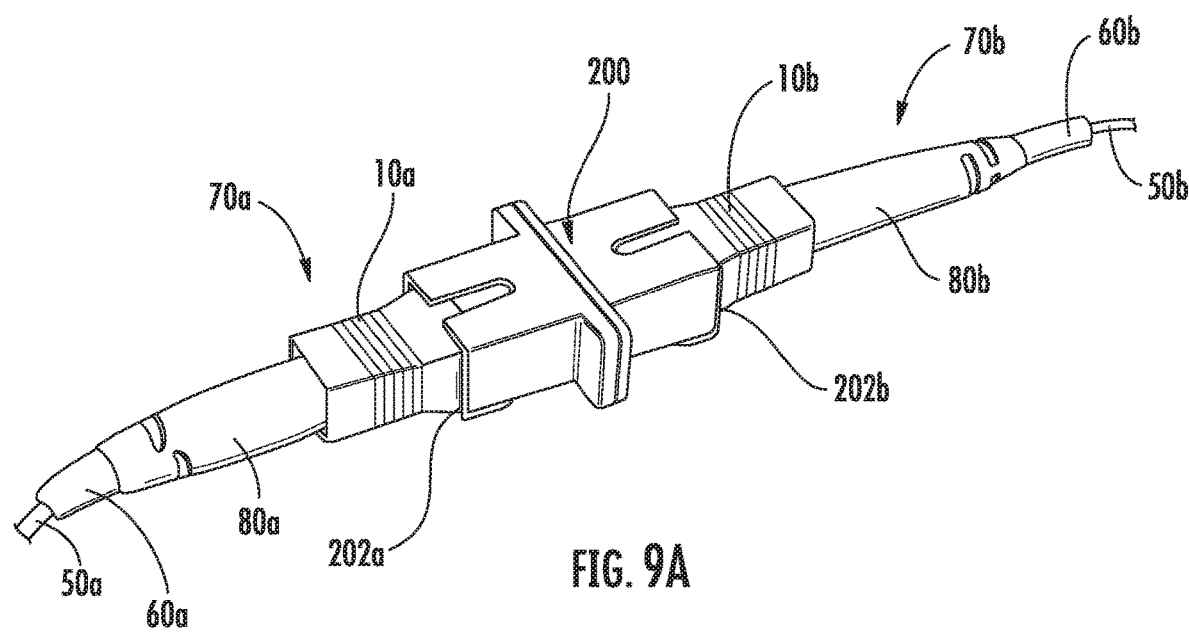
FIG. 9A is an elevated perspective view of two cable assemblies mated by way of respective connectors inserted into an adapter.

FIG. 9A shows cable assemblies 70a and 70b with respective cables 60a, 60b, connectors 10a, 10b, and boots 80a, 80b. The cable assemblies 70a, 70b are operably connected ("mated" or "coupled") using via an adapter module 200 (or simply "adapter 200") that includes opposite input ends 202a, 202b. The adapter 200 is configured to receive the connectors 10a, 10b in respective input ends 202a, 202b to establish an optical connection between the optical fibers 50a, 50b respectively carried by the cables 60a, 60b.

Figure 9B:
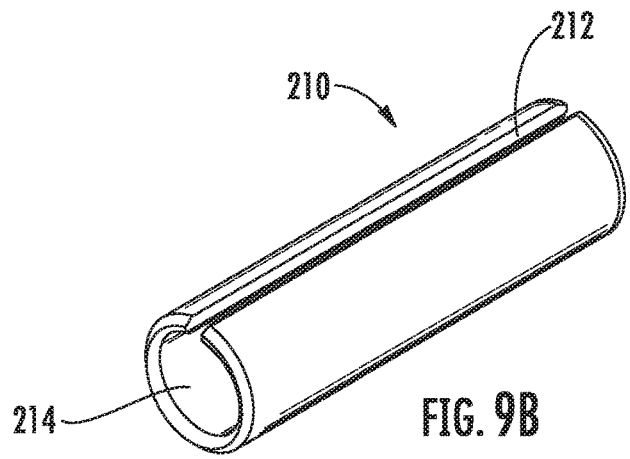
FIG. 9B is a perspective view of an alignment sleeve that resides in the adapter of FIG. 9A.

The adapter 200 also includes an alignment sleeve 210, as shown in the perspective view of FIG. 9B. The alignment sleeve 210 in the embodiment shown has a C-shaped cross-section defined by an axially running slot 212. The alignment sleeve 210 also has an interior 214 with a diameter that is slightly smaller than the diameter of the ferrules 100a, 100b (FIG. 9C) of connectors 10a, 10b.

Figure 9C:
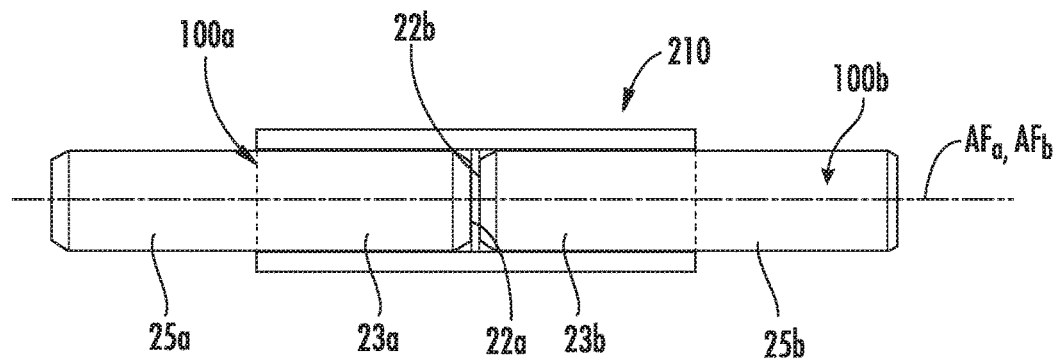
FIG. 9C is a cross-sectional view of the alignment sleeve of FIG. 9B and shows two ferrules arranged within an interior of the alignment sleeve.

FIG. 9C is a cross-sectional view of the alignment sleeve 210 with the respective front-end sections 23a, 23b of the ferrules 100a, 100b residing in the interior 214 so that the respective front ends 22a, 22b of ferrules 100a, 100b are confronting. The axially running slot 212 allows the alignment sleeve 210 to expand slightly to accommodate the front ends 22a, 22b. This results in a tight fit of respective front-end sections 23a, 23b of the ferrules 100a, 100b within the interior 214 of the alignment sleeve 210 so that the respective ferrule axes $AF_a$ and $AF_b$ are substantially aligned. FIG. 9C illustrates how the shape of the front-end section 23 of each ferrule 100a, 100b determines how each ferrule will sit within the interior 214 of the alignment sleeve 210 and align with the other ferrule.

When two connectors 10 are formed using the methods disclosed herein to have a low concentricity error E and are then mated (e.g. using the adapter 200), the resulting connection is likely to have improved coupling efficiency compared to mated connectors having ferrules formed using conventional techniques.

Example Methods of Forming Ferrules

Various examples of how the ferrule 100 may be formed will now be described. As mentioned above, the inner member 102 may initially exist independently from the outer member 104, which may not yet be constructed or at least not yet be: i) positioned over and secured relative to the inner member 102, and ii) if applicable, processed to a final intended geometry for the ferrule 100. In other words, the outer member 104 is not yet formed over the inner member 102 in a manner that results in the outer surface 90 (which is that of the outer member 104) defining an exterior of the ferrule 100.

Figure 10:
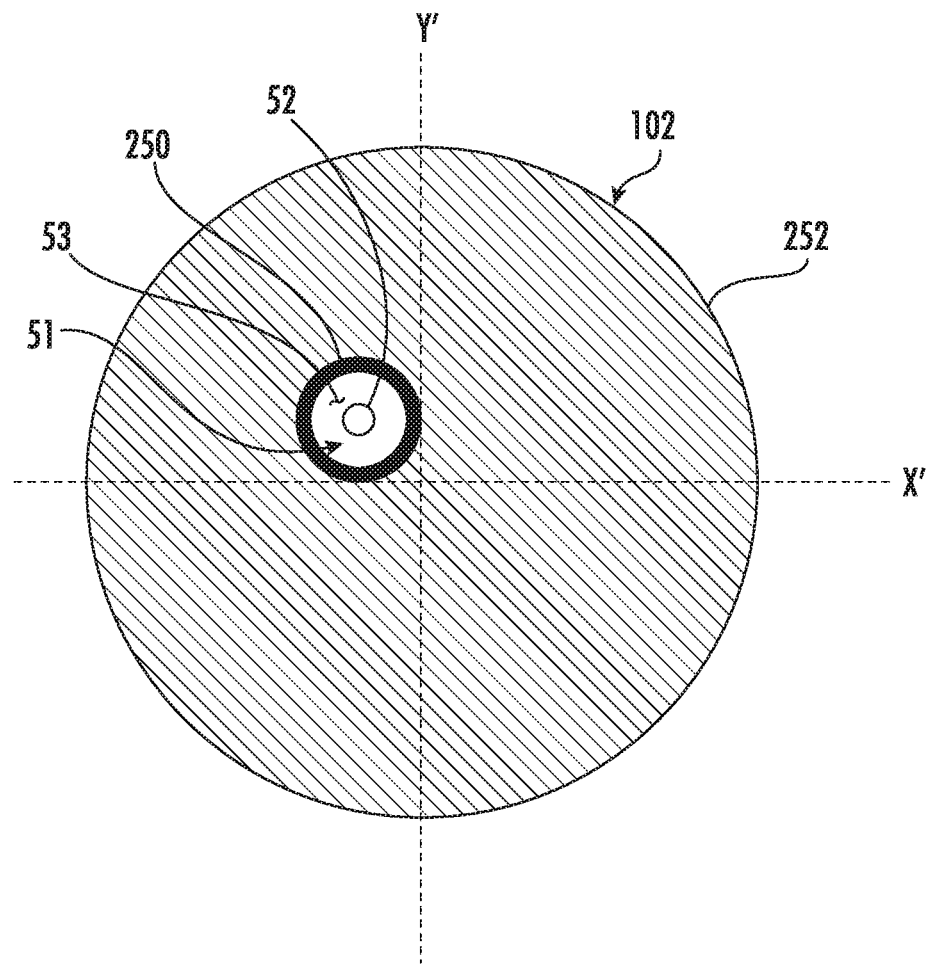
FIG. 10 is a schematic front-end view of an example of an inner member for a ferrule, such as the ferrule of FIGS. 5C and 5D, shown with an optical fiber secured in an axial bore of the inner member, and with a core of the optical fiber being radially offset from a geometric center of the inner member.

The methods involve securing the optical fiber 50 in the axial bore 92 of the inner member 102. To this end, FIG. 10 illustrates the inner member 102 of FIGS. 7A, 7B, 8A, and 8B in isolation, with cross-hatching added to the figure to better distinguish between the inner member 102 and the bare fiber section 51. The bare fiber section 51 is secured in the axial bore using an adhesive material 250 (shown in solid black), such as epoxy, which may be deposited in the axial bore 92 before, during, and/or after inserting the bare fiber section 51 into the axial bore 92. The adhesive material 250 may be deposited in a liquid state or, if deposited before inserting the bare fiber section 51, in a solid state. Examples of a solid adhesive material being loaded into a ferrule bore and stored for a period of time before inserting an optical fiber are disclosed in U.S. Pat. Nos. 8,702,322, 9,128,254, and 9,588,303. Regardless, at some point the adhesive material 250 is heated to become flowable (e.g., before being deposited into the axial bore 92 when being deposited as a liquid, or after being deposited into the axial bore 92 as a solid). Ultimately the adhesive material 250 occupies space between the bare fiber section 51 and the axial bore 92, as shown in FIG. 10.

Although FIG. 10 illustrates the bare fiber section 51 being centered in the axial bore 92 such that the adhesive material 250 surrounds the bare fiber section 51 in the axial bore 92, this may not be the case in all embodiments. For example, in some embodiments the cladding 54 of the bare fiber section 51 may be in contact with a portion of the axial bore 92 due to the bare fiber section 51 not being centered in the axial bore 92 (e.g., due at least in part to the core 52 of the bare fiber section 51 being offset from the bore axis AB). The adhesive material 250 in such embodiments may only surround a portion of the bare fiber section 51; space between the bare fiber section 51 and the axial bore 92 does not exist where the cladding 54 is in contact with the axial bore 92.

Still referring to FIG. 10, concentricity error (i.e., offset) between the core 52 of the bare fiber section 51 and the geometric center 152 of the inner member 102 can be seen. Notations for the offset distance and direction are not included in FIG. 10 to simplify the drawing; reference can be made to FIGS. 7B and 8B for these aspects. This concentricity error is measured before forming the outer member 104 over the inner member 102. Thus, the offset distance $\delta_1$ of the core 52 from the geometric center 152 is measured, as is the offset direction $\theta_1$ (see FIGS. 7B and 8B). As mentioned above, the same techniques that are known for determining the ferrule geometric center 94 and core-to-ferrule concentricity error E for conventional ferrules may be used for determining the geometric center 152 and concentricity error $E_1$. The geometric center 152 is based on the profile of an outer surface 252 of the inner member 102, just as the ferrule geometric center 94 is based on the profile of the outer surface 90 (see initial discussion of the ferrule 12 above).

To be clear, measuring the offset distance $\delta_1$ is different than simply measuring the offset of the bore axis AB from the geometric center 152. The latter may not accurately represent the offset distance $\delta_1$ due to the potential for: i) the core 52 to be offset relative to the cladding 54 (core-to-cladding eccentricity), and ii) the bore axis AB to be offset relative to the geometric center 152 ("bore-to-inner member" eccentricity). Measuring the offset distance $\delta_1$ is more involved and may, for example, including launching light into a remote end of the optical fiber 50 and monitoring the light emitted from the front end face 53 of the bare fiber section 51 that resides substantially at the front end 22 of the ferrule 100. The '097 publication mentioned above discloses examples like this, but it should be noted that any known technique for measuring $\delta_1$ and $\theta_1$ may be used.

In each of the examples that follow, the concentricity error $E_1$ is taken into consideration to strategically form the outer member 104 over the inner member 102. When formation of the outer member 104 is complete, the outer member 104 includes the outer surface 90 that defines the exterior of the ferrule 100 (and, therefore, the ferrule geometric center 94 as well). The core 52 of the bare fiber section 51 is located the distance $\delta_2$ from the ferrule geometric center 94, and $\delta_2$ is less than $\delta_1$ (see e.g., discussion of FIGS. 8A and 8B above). The closer alignment of the core 52 to the ferrule geometric center 94 compared to the geometric center 152 of the inner member 102 can be seen in the figures illustrating the example methods even though $\delta_2$ and $\theta_2$ are not included in the drawings. As with $\delta_1$ and $\theta_1$, reference can be made to FIGS. 7B and 8B to appreciate these aspects.

The outer member 104 may be formed by depositing or otherwise adding material onto the inner member 102. In the example method illustrated in FIGS. 11A-11C, the inner member 102 of FIG. 10 can be rotated and optionally translated as material is added around the inner member 102. The material of the outer member 104 may be applied to the inner member 104 using known techniques, such as outside vapor deposition. The rotational speed, translation (if applicable), and/or deposition rate of material can be controlled to result in the ferrule geometric center 94 (as defined by the profile of the outer surface 90 of the outer member 104 that is formed; see FIG. 8B) being more closely aligned with the core 52 (i.e., $\delta_2<\delta_1$). For example, the "core-to-inner member" concentricity error $E_1$ may be used to determine the appropriate speed of rotation and deposition rate of material as a function of angle about the rotational axis.

Figure 11A:
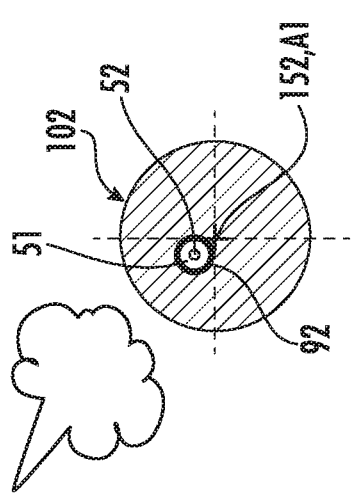
FIGS. 11A-11C are schematic front-end views showing a first example method of how an outer member may be formed over the inner member of FIG. 10 to result in a ferrule that has a geometric center closely aligned with the core of the optical fiber, with the method involving depositing material onto the inner member.
Figure 11B:
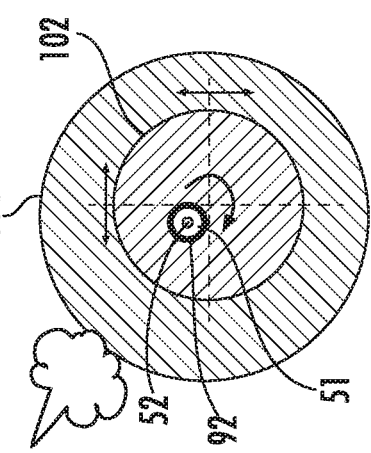
Figure 11C:
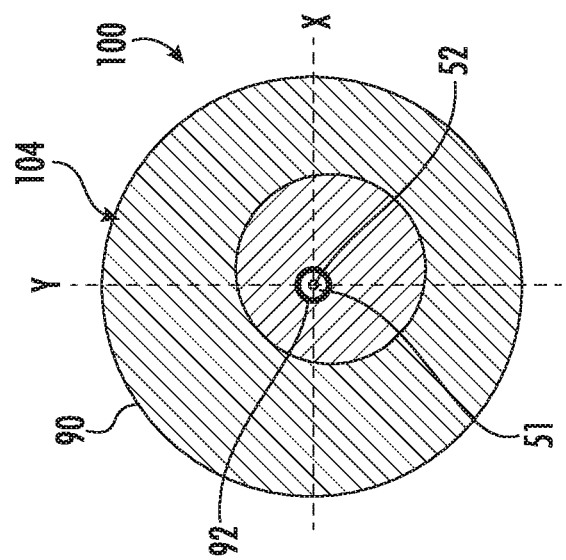

It should be kept in mind that FIGS. 11A-11C are merely schematic views to illustrate basic principles of one example. Although the outer member 102 is illustrated as being a uniform material, in some embodiments there may be one or more intermediate layers of different materials between the inner member 102 and outer member 104.

In the example method illustrated in FIGS. 12A-12D, the inner member 102 of FIG. 10 is positioned within a mold cavity 302 of a mold 300. The mold cavity 302 is cylindrical, and the inner member 102 is positioned so that the core 52 of the bare fiber section 51 at the front end face 53 is located substantially on (i.e., aligned with) a central axis of the mold cavity 302. FIG. 12A shows three mold pins 304 extending into the mold cavity 302 to support the inner member 102. The mold pins 304 may be moved to extend further into or out of the mold cavity 302 to appropriately position the inner member 102 and, therefore, the core 52 of the bare fiber section 51 that is secured in the axial bore 92 of the inner member 102. Other embodiments may use more than three mold pins, and some embodiments may position the inner member 102 within the mold cavity using other techniques.

As shown in FIG. 12B, the mold cavity 302 is filled with material once the inner member 102 has been positioned. The material is a curable material and may be different than the material of the inner member 102. Once the material that has been filled into the mold cavity 302 has cured, the outer member 104 has been formed. The mold pins 304 may be removed from the mold cavity 302, as shown in FIG. 12C, and space previously occupied by the mold pins 304 may be filled with material (e.g., the same curable material used to form the outer member 104; see FIG. 12D). Alternatively, in some embodiments, portions of the mold pins 304 extending from the outer surface 90 may be removed, and the remaining portions of the mold pins 304 within the outer member 104 may remain a part of the ferrule 100. FIG. 12D shows the completed ferrule 100 removed from the mold 300, with the outer member 104 defining the exterior of the ferrule 100.

FIGS. 13A-13D are schematic front-end views showing another example of how an outer member 104 may be formed over the inner member 102 of FIG. 10 to result in a ferrule that has a geometric center closely aligned with the core 52 of the bare fiber section 51. In this example, the outer member 104 comprises a polymer material and the inner member 102 comprises a different material, such as a ceramic (e.g., zirconia) or glass. The outer member 104 is initially formed over the inner member 102, such as by molding, 3D printing, outside vapor deposition, or any other suitable technique. FIG. 13A illustrates an initially-formed ferrule 100' including the inner member 102 and outer member 104. The initially-formed ferrule 100' is then positioned in a mold 300, as shown in FIG. 13B. Heat is applied to cause at least some of the polymer material of the outer member 104 to become flowable. This allows the inner member 102 to then be moved within the outer member 104 to position the core 52 of the bare fiber section 51 closer to the ferrule geometric center 94, as shown in FIG. 13C. Once the inner member 102 is appropriately positioned, the outer member 104 is then cooled so that the polymer material that was previously made flowable solidifies and secures the inner member 102 in position. The cooling may be achieved without any assistance (i.e., passively) or with fans or other assistance (i.e., actively). FIG. 13D shows the completed ferrule 100 removed from the mold 350, with the outer member 104 defining the exterior of the ferrule 100.

FIGS. 14A-14C illustrate an example method that is similar to that shown in FIGS. 13A-13D in that the outer member 104 is initially formed over the inner member 102 to form an interim assembly 100' that is further processed to the result in the inner member 102 being in a desired position. As shown in FIG. 14A, material of the outer member 104 may be initially deposited or otherwise added around the inner member 102 without regard to the position of the core 52 of the bare fiber section 51. Then, as shown in FIG. 14B, material may be removed from the outer surface 90' of the initially-formed outer member 104. The removal of material changes the profile of the outer surface 90' and, therefore, changes the ferrule geometric center. The concentricity error $E_1$ is taken into account during this processing so that ferrule geometric center shifts closer to the core 52 of the bare fiber section 51. Stated differently, the material of the outer member 104 is removed to ultimately result in the core 52 of the bare fiber section 51 being positioned closer to the ferrule geometric center by the time the processing is complete and the outer member 104 has the intended shape of the ferrule 100 (see FIG. 14C, with the outer surface 90 of the outer member 104 defining the exterior of the ferrule 100). Although FIG. 14B only schematically illustrates material being removed from the outer surface 90', in some embodiments the additional processing of the initially-formed outer member 104 may also include depositing additional material to select portions of the outer surface 92'.

In the four example methods just discussed, the outer member 104 is not constructed until after the sub-assembly of the inner member 102 and bare fiber section 51 is formed and the concentricity error $E_1$ is determined. Embodiments are also possible that utilize "pre-formed" or "pre-constructed" outer members that have not yet been positioned over and secured relative to an inner member. Thus, the outer member in such embodiments may be generally "formed," but have still not been formed over an inner member to result in a ferrule having an exterior defined by the outer member. FIGS. 15A-15D illustrate on example of this type of embodiment, where the pre-constructed outer member 104 is tubular so as to have an inner passage 400 extending through the outer member.

As shown in FIG. 15A, the inner member 102 is inserted into the inner passage 400 of the outer member 104 and positioned within the inner passage 400 so that the core 52 of the bare fiber section 51 is located substantially on the ferrule central axis AF. The inner passage 400 may have a relatively cross-sectional area compared to the inner member 102 to allow many different positions. Additionally, the outer member 104 may accommodate pins 402 for positioning the inner member 102 within the inner passage 400 and, in this respect, function much like a mold cavity. Other ways of handling the inner member 102 to control the positioning are also possible. Regardless, once the inner member 102 has been set to the desired position relative to the outer member 104, space in the inner passage 400 between the inner member 102 and outer member 104 is filled with an adhesive material 404, such as epoxy, as shown in FIG. 15B. The adhesive material 404 is then cured to secure the inner member 102 in the desired position. If present, the pins 402 may be removed (FIG. 15C), and portions of the outer member 104 previously occupied by the pins 402 may be filled with material (e.g., the same adhesive material used to fill the inner passage 400; see FIG. 15D).

Figure 16A:
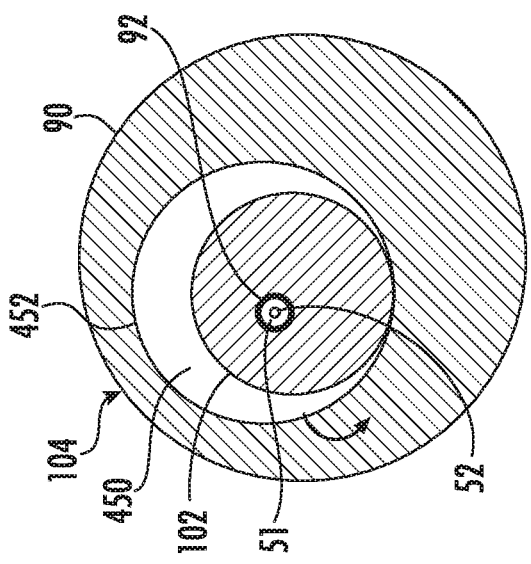
FIGS. 16A-16D are schematic front-end views showing a sixth example method of how an outer member may be formed over the inner member of FIG. 10 to result in a ferrule that has a geometric center closely aligned with the core of the optical fiber, with the method involving a pre-constructed outer member having a bore that is offset from the ferrule geometric center by a distance similar to the offset of the core of the optical fiber from the geometric center of the inner member.

FIGS. 16A-16D illustrate another example method involve a pre-constructed outer member. The outer member 104 in FIGS. 16A-16D is tubular like the previous example, and thus includes an inner passage 450 extending therethrough. More specifically, the outer member includes a bore 452 ("outer member bore") defining the inner passage 450. FIG. 16A illustrates a center 454 of the outer member bore 452 being offset from a center of the outer member 104. The latter ultimately represents the ferrule geometric center 94 (e.g., once the ferrule 100 is formed with both the inner member 102 and outer member 104), and for convenience will be referred to as such even though the inner member 102 may not yet be present.

In the example method of FIGS. 16A-16D, the outer member 104 is selected from a population of pre-constructed outer members (not shown) that each has a measured concentricity error between the center 454 of the outer member bore 452 and the ferrule geometric center 94. The magnitude of the measured concentricity error of the outer member 104 that is selected is substantially the same as (e.g., within 0.1 µm) as the magnitude of the "core-to-inner member" concentricity error. Thus, the offset distance $\delta_1$ of the inner member 102 of FIG. 10 determines which of the outer members to select from the population.

Figure 16B:
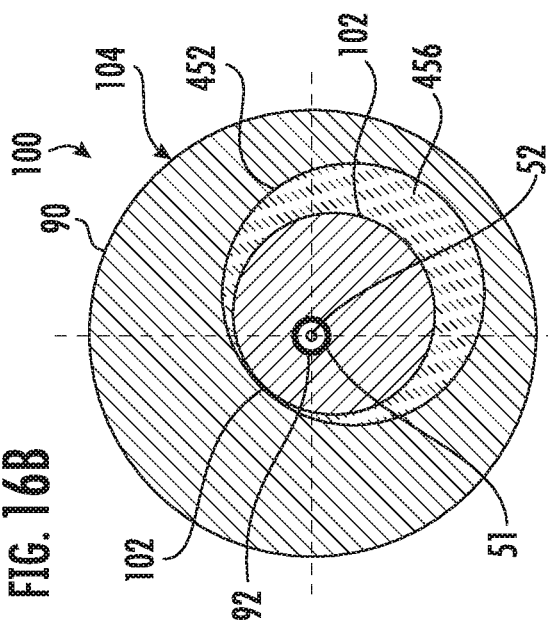
Figure 16C:
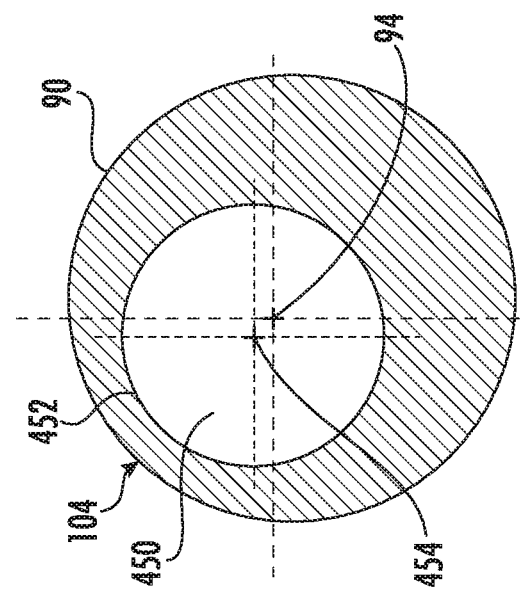
Figure 16D:
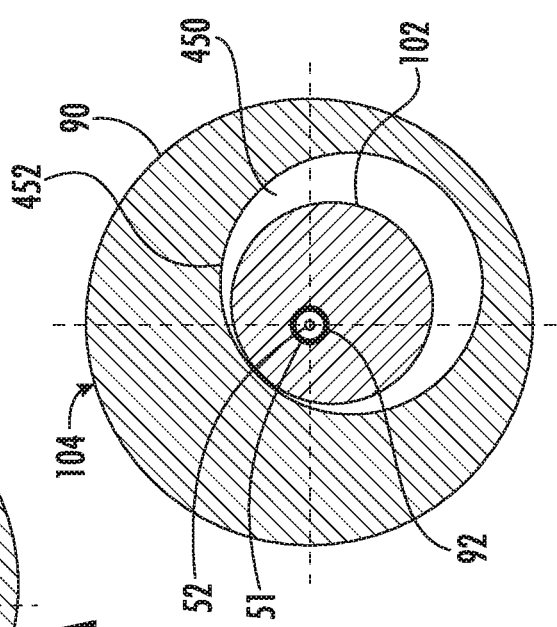

As shown in FIG. 16B, the inner member 102 is inserted into the outer member bore 452 of the outer member 104 that was selected. The inner member 102 is then rotated relative to outer member 104, or vice versa, to move the core 52 of the bare fiber section 51 closer to the ferrule geometric center 94. FIG. 16C illustrates a desired position of the inner member 102 and bare fiber section 51, where the core 52 is substantially aligned with the ferrule geometric center 94 (not labeled in FIG. 16C). Adhesive material 456 (FIG. 16D), such as epoxy, is then filled into the outer member bore 452 to occupy space between the inner member 102 and outer member 104. The adhesive material 456 is then cured to secure the inner member 102 and core 52 of the bare fiber section 51 in the desired position.

Many more examples of forming the outer member over the inner member 102 to define the ferrule 100 and to result in $\delta_2 < \delta_1$ will be appreciated by skilled persons. Regardless of how the ferrule 100 is formed, the ferrule 100 ultimately may be assembled with the bare fiber section 51 in the connector 10 (FIGS. 1 and 2) to form the cable assembly 70 (FIGS. 3 and 4).

Considerations in Light of the Methods

The outer member 104 being formed to "correct" the "core-to-inner member" concentricity error $E_1$ has several advantages in addition to a low core-to-ferrule concentricity error in the cable assembly 70 and the associated low insertion loss. The advantages can be best appreciated by first considering the situation with conventional ferrules, such as the ferrule 12 (FIGS. 1-3, 5A, 5B). Conventional ferrules are typically made from ceramic material, such as zirconia, due to desirable properties associated with such material, including relatively high strength and hardness (low coefficient of elasticity). These properties promote durability and help ensure that a ferrule is able to withstand the impact forces during mating and maintain the position of an optical fiber that has been secured in the ferrule bore.

As mentioned above, sources of core-to-ferrule eccentricity (CTFE)—and thus the associated insertion loss—include: 1) offset (non-centering) of the fiber core relative to the fiber cladding; 2) offset of the fiber within the ferrule bore; and 3) offset ferrule bore relative to the ferrule center. The manufacture of a ferrule significantly affects the latter two sources of error, which are generally considered to have a larger impact on CTFE than core-cladding offset. For example, a ferrule bore that is very close in diameter to the outer diameter of the optical fiber may reduce the potential for offset of the optical fiber within the ferrule bore, but may make it more challenging to insert the optical fiber. Manufacturing tolerances must be carefully controlled the closer a ferrule bore diameter is made to that of the optical fiber, but this typically comes with increased costs. The same applies with respect to centering the ferrule bore within the ferrule. That is, manufacturing tolerances can be "tightened," but there is typically increased cost associated with doing so. The use of a ceramic material can be a key driver of the costs associated with reducing manufacturing tolerances due to the challenges of processing such material.

In ferrules 100 resulting from methods according to this disclosure, the inner member 102 defines the front end 22 of the ferrule 100 in the region immediately surrounding the end face 53 of the bare fiber section 51. This region typically experiences the greatest forces during mating, as the front end 22 is typically polished to have a small amount of curvature and thereby promote physical contact between the end faces of optical fibers during the mating of two ferrules in an adapter (e.g., the adapter 200). The inner member 102 can be made from a ceramic material or other material with desirable properties for durability, similar to a conventional ferrule. However, because the "core-to-inner member" concentricity error $E_1$ is ultimately "corrected" by the formation of the outer member 104, the dimensional requirements or manufacturing tolerances associated with inner member 104 can be significantly "loosened" compared to conventional ferrules.

For example, ferrule bores typically have diameters less than 128 µm to provide a close fit with bare optical fibers having nominal diameters of 125 µm. The inner member 102 used in methods according to this disclosure may include the axial bore 92 having a diameter that is at least 128 µm, or perhaps even at least 130 µm. Although the large diameter of the axial bore 92 increases the potential for concentricity error $E_1$, the process of forming the outer member 104 can effectively be used as a correction mechanism for this source of error.

As another example, conventional ferrules for single-fiber connectors typically have a nominal diameter dF of 1.25 mm or 2.5 mm, but a circularity tolerance of only 0.5 µm. The term "circularity tolerance" refers to the maximum acceptable radial distance between two concentric circles within which all points on a cross-section of the ferrule outer surface lie, and such radial distance differential is considered as "circularity error." Thus, the circularity error is a characterization of non-circularity (i.e., out-of-roundness; "circularity" exists when all points on the ferrule outer surface are equidistant from the ferrule geometric center). The inner member 102 used in methods according to this disclosure may have a circularity error, as defined by the profile of the outer surface 252 (FIG. 10) in a plane perpendicular to the central axis AI, greater than 0.5 µm, or even greater than 1.0 µm in some embodiments.

The overall circularity error of the ferrule 100 can still be kept within a typical circularity tolerance (e.g., 0.5 µm or less, as defined by the outer surface 90) by controlling the manufacture/formation of the outer member 104. As mentioned above, the outer member 104 may be formed from a different material than the inner member 102. The need for a durable material, such as a ceramic, may not be as important if the inner member 102 is the portion of the ferrule 100 that experiences the most forces and wear from mating. A material that is cheaper in cost, less expensive to process, and/or easier to manufacture with a high degree of precision (low tolerances) may be chosen for the outer member 104. In some embodiments, the outer member 104 may comprise a polymer, metal, glass, or ceramic material that is different than the ceramic material of the inner member 102.

It has already been discussed how the overall core-to-ferrule concentricity error $E_2$, and specifically the magnitude of such error (the offset distance $\delta_2$) remains low in the ferrule 100. In some embodiments, $\delta_2$ may be less than 1.2 µm, less than 0.6 µm, or even less than 0.3 µm. It does not matter that the offset distance $\delta_1$ associated with the inner member 102 is much larger, such as being at least 1.2 µm, at least 1.8 µm, or even at least 3.6 µm.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A method of forming a ferrule that includes an inner member with an axial bore for supporting an optical fiber, the method comprising:
    securing the optical fiber in the axial bore of the inner member, wherein the optical fiber comprises a core and a cladding;
    measuring a distance $\delta_1$ from an inner member geometric center to the core of the optical fiber, wherein the inner member geometric center is based on a profile of a first outer surface of the inner member; and
    forming an outer member over the inner member, wherein:
        the outer member includes a second outer surface that defines an exterior of the ferrule;
        the ferrule includes a ferrule geometric center based on a profile of the second outer surface of the outer member;
        the outer member is formed so that the core of the optical fiber is located a distance $\delta_2$ from the ferrule geometric center; and
        the distance $\delta_2$ is less than the distance $\delta_1$.

2. The method of claim 1, wherein securing the optical fiber in the axial bore of the inner member comprises:
    inserting the optical fiber into the axial bore;
    depositing adhesive material in the axial bore before or after inserting the optical fiber into the axial bore, wherein the adhesive material occupies space between the optical fiber and the axial bore after said inserting;
    heating the adhesive material before or after said depositing to make the adhesive material flowable; and
    curing the adhesive material.

3. The method of claim 1, wherein:
    the inner member includes a first central axis that extends through the inner member geometric center;

the step of measuring the distance $\delta_1$ further comprises measuring an angular direction $\theta_1$ from the inner member geometric center to the core of the optical fiber; and the angular direction $\theta_1$ is measured relative to a reference line passing through the inner member geometric center in a plane perpendicular to the first central axis of the inner member.

4. The method of claim 1, wherein the inner member comprises a first material, and wherein the outer member comprises a second material that has a higher elasticity than the first material.

5. The method of claim 1, further comprising:
forming at least one intermediate member around the inner member before forming the outer member such that the outer member is formed around both the inner member and the at least one intermediate member, wherein the inner member, the at least one intermediate member, and the outer member comprise different materials.

6. The method of claim 1, wherein the optical fiber includes a front end face that resides substantially at a front end of the ferrule, and wherein forming the outer member comprises:
positioning the inner member within a mold cavity that is cylindrical so that the core of the optical fiber at the front end face is located substantially on a central axis of the mold cavity;
filling the mold cavity with a curable material; and
curing the curable material to form the outer member.

7. The method of claim 1, wherein:
the optical fiber includes a front end face that resides substantially at a front end of the ferrule;
the outer member comprises a polymer material and the inner member comprises a ceramic material; and
forming the outer member comprises:
initially forming the outer member over the inner member define an initially-formed ferrule;
positioning the initially-formed ferrule within a mold;
heating the outer member so that at least some of the polymer material becomes flowable;
moving the inner member within the outer member while the at least some of the polymer material is flowable, wherein said moving positions the core of the optical fiber closer to the ferrule geometric center; and
cooling the outer member actively or passively after moving the inner member to complete the formation of the ferrule.

8. The method of claim 1, wherein the outer member is tubular so as to have an inner passage extending therethrough, and wherein forming the outer member comprises:
positioning the inner member within the inner passage of the outer member so that the core of the optical fiber at a front end face of the optical fiber is located substantially on a ferrule central axis that extends through the ferrule geometric center;
filling space in the inner passage between the outer member and the inner member with an adhesive material; and
curing the adhesive material.

9. The method of claim 1, wherein forming the outer member comprises:
initially forming the outer member around the inner member to initially define the second outer surface and the ferrule geometric center; and
removing, adding, or both removing and adding material to the second outer surface of the outer member to change the profile of the second outer surface and thereby change ferrule geometric center so that the core of the optical fiber is positioned closer to the ferrule geometric center.

10. The method of claim 1, wherein forming the outer member comprises:
selecting the outer member from a population of pre-formed outer members after measuring the distance $\delta_1$ from the inner member geometric center to the core of the optical fiber, wherein:
each of the pre-formed outer members is tubular, includes an outer member bore defining an inner passage, and has a measured concentricity error between a geometric center of the outer member bore and the ferrule geometric center; and
the measured concentricity error of the outer member that is selected is substantially the same as the distance $\delta_1$ from the inner member geometric center to the core of the optical fiber;
inserting the inner member in the outer member bore of the outer member that was selected;
causing relative rotation between the outer member and the inner member to move the core of the optical fiber closer to a desired position where the core is aligned with or closer to the ferrule geometric center;
positioning adhesive material in space between the outer member and the inner member;
curing the adhesive material to secure the inner member within the outer member with the core of the optical fiber in the desired position.

11. The method of claim 1, wherein the outer member is formed so that the distance $\delta_2$ is less than one-third the distance $\delta_1$.

12. The method of claim 1, wherein the profile of the first outer surface of the inner member has circularity error greater than 1.0 μm.

13. The method of claim 12, wherein the outer member is formed so that the profile of second outer surface has a circularity error of 0.5 μm or less.

14. The method of claim 1, wherein the optical fiber has a nominal diameter of 125 μm defined by the cladding, and wherein the axial bore of the inner member has a diameter that is at least 128 μm.

15. An optical fiber cable assembly, comprising:
an optical fiber cable having an optical fiber with a core surrounded by a cladding; and
an optical fiber connector installed on the optical fiber cable, wherein the optical fiber connector includes a ferrule comprising:
an inner member with an axial bore that supports the optical fiber, the inner member having a first outer surface; and
an outer member positioned over the inner member and having a second outer surface that defines an exterior of the ferrule;
wherein:
the inner member includes an inner member geometric center based on a profile of the first outer surface and a first central axis extending through the inner member geometric center, the core of the optical fiber being located a distance $\delta_1$ from the inner member geometric center;
the ferrule includes a ferrule geometric center based on a profile of the second outer surface and a ferrule central axis extending through the ferrule geometric center, the core of the optical fiber being located a distance $\delta_2$ from the ferrule geometric center; and the distance $\delta_1$ is greater than the distance $\delta_2$.

16. The optical fiber cable assembly of claim 15, wherein the distance $\delta_2$ is less than one-third the distance $\delta_1$.

17. The optical fiber cable assembly of claim 15, wherein the profile of the first outer surface of the inner member has circularity error greater than 1.0 μm.

18. The optical fiber cable assembly of claim 17, wherein the profile of second outer surface has a circularity error of 0.5 μm or less.

19. The optical fiber cable assembly of claim 15, wherein the inner member comprises a first material, and wherein the outer member is formed from a second material that is less rigid than the first material.

20. A method of forming a ferrule that includes an inner member with an axial bore in which an optical fiber is secured, wherein a core of the optical fiber is located a distance $\delta_1$ from a geometric center of the inner member that is based on a profile of a first outer surface of the inner member, the method comprising:

forming an outer member over the inner member, wherein:
- the outer member includes a second outer surface that defines an exterior of the ferrule;
- the ferrule includes a ferrule geometric center based on a profile of the second outer surface of the outer member and a ferrule central axis extending through the ferrule geometric center;
- the outer member is formed so that the core of the optical fiber is located a distance $\delta_2$ from the ferrule geometric center; and
- the distance $\delta_2$ is less than the distance $\delta_1$.

* * * * *